(12) United States Patent
Mizoguchi et al.

(10) Patent No.: US 7,356,190 B2
(45) Date of Patent: Apr. 8, 2008

(54) IMAGE AREA EXTRACTION METHOD, IMAGE RECONSTRUCTION METHOD USING THE EXTRACTION RESULT AND APPARATUS THEREOF

(75) Inventors: Shigeru Mizoguchi, Kanagawa (JP); Naohisa Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/608,001

(22) Filed: Jun. 30, 2003

(65) Prior Publication Data

US 2004/0071352 A1  Apr. 15, 2004

(30) Foreign Application Priority Data

| Jul. 2, 2002 | (JP) | 2002-193620 |
| Jul. 2, 2002 | (JP) | 2002-193621 |
| Jul. 2, 2002 | (JP) | 2002-193622 |
| Jun. 26, 2003 | (JP) | 2003-183219 |

(51) Int. Cl.
*G06K 9/36* (2006.01)
*G06K 9/46* (2006.01)

(52) U.S. Cl. .............. 382/233; 382/236; 382/250; 382/251; 382/167; 382/274; 358/518; 358/519; 375/240; 375/240.03; 375/240.16

(58) Field of Classification Search ............... 382/232, 382/233, 236, 240, 245, 246, 250, 251, 166, 382/167, 274, 190, 199; 358/518, 519, 520, 358/521, 522, 523, 1.9; 375/240, 240.03, 375/240.12, 240.16, 240.2; 348/14.13
See application file for complete search history.

(56) References Cited

U.S. PATENT DOCUMENTS

| 4,672,463 A | 6/1987 | Tomohisa et al. |
| 5,165,072 A * | 11/1992 | Kurita et al. ............... 358/448 |
| 5,742,410 A * | 4/1998 | Suzuki ...................... 358/518 |
| 5,805,727 A | 9/1998 | Nakano ..................... 382/195 |

(Continued)

FOREIGN PATENT DOCUMENTS

JP  61-230571  10/1986

(Continued)

OTHER PUBLICATIONS

U.S. Appl. No. 10/386,714, filed Mar. 13, 2003, Ryosuke Iguchi et al.

(Continued)

*Primary Examiner*—Matthew C. Bella
*Assistant Examiner*—Ali A. B Bayat
(74) *Attorney, Agent, or Firm*—Fitzpatrick, Cella, Harper & Scinto

(57) ABSTRACT

An image area of interest in an image file can be detected by a method with a relatively light processing load by making a determination using characteristics of a quantization table. Since spatial frequency information, chromaticity information, and a quantization table are acquired for respective predetermined blocks from inputted compressed image data, and are used in combination upon searching the compression-recorded image data for an image of interest, information containing AC component information for each image data block is acquired without any advanced calculations, thus searching for the image of interest in the image file.

36 Claims, 68 Drawing Sheets
(13 of 68 Drawing Sheet(s) Filed in Color)

U.S. PATENT DOCUMENTS

| | | |
|---|---|---|
| 6,343,141 B1 | 1/2002 | Okada et al. |
| 6,463,163 B1 | 10/2002 | Kresch |
| 6,532,307 B1 | 3/2003 | Sato .......................... 382/240 |
| 6,665,446 B1* | 12/2003 | Kato .......................... 382/251 |
| 6,987,535 B1* | 1/2006 | Matsugu et al. ............ 348/239 |
| 2003/0138126 A1* | 7/2003 | Hashimoto ................. 382/100 |
| 2004/0070526 A1* | 4/2004 | Horie ......................... 341/107 |
| 2004/0218235 A1* | 11/2004 | Kawano ..................... 358/505 |
| 2007/0047034 A1* | 3/2007 | Ogata et al. ................ 358/521 |
| 2007/0103745 A1* | 5/2007 | Ogata et al. ................ 358/521 |

FOREIGN PATENT DOCUMENTS

| | | |
|---|---|---|
| JP | 6-149959 | 5/1994 |
| JP | 8-63597 | 3/1996 |
| JP | 8-161497 | 6/1996 |
| JP | 9-330407 | 12/1997 |
| JP | 10-13832 | 1/1998 |
| JP | 10-162128 | 6/1998 |
| JP | 11-73512 | 3/1999 |
| JP | 11-238067 | 8/1999 |
| JP | 11-316837 | 11/1999 |
| JP | 2000-048036 | 2/2000 |
| JP | 2000-182043 | 6/2000 |
| JP | 2000-207565 | 7/2000 |

OTHER PUBLICATIONS

U.S. Appl. No. 10/386,606, filed Mar. 13, 2003, Ryosuke Iguchi et al.

* cited by examiner

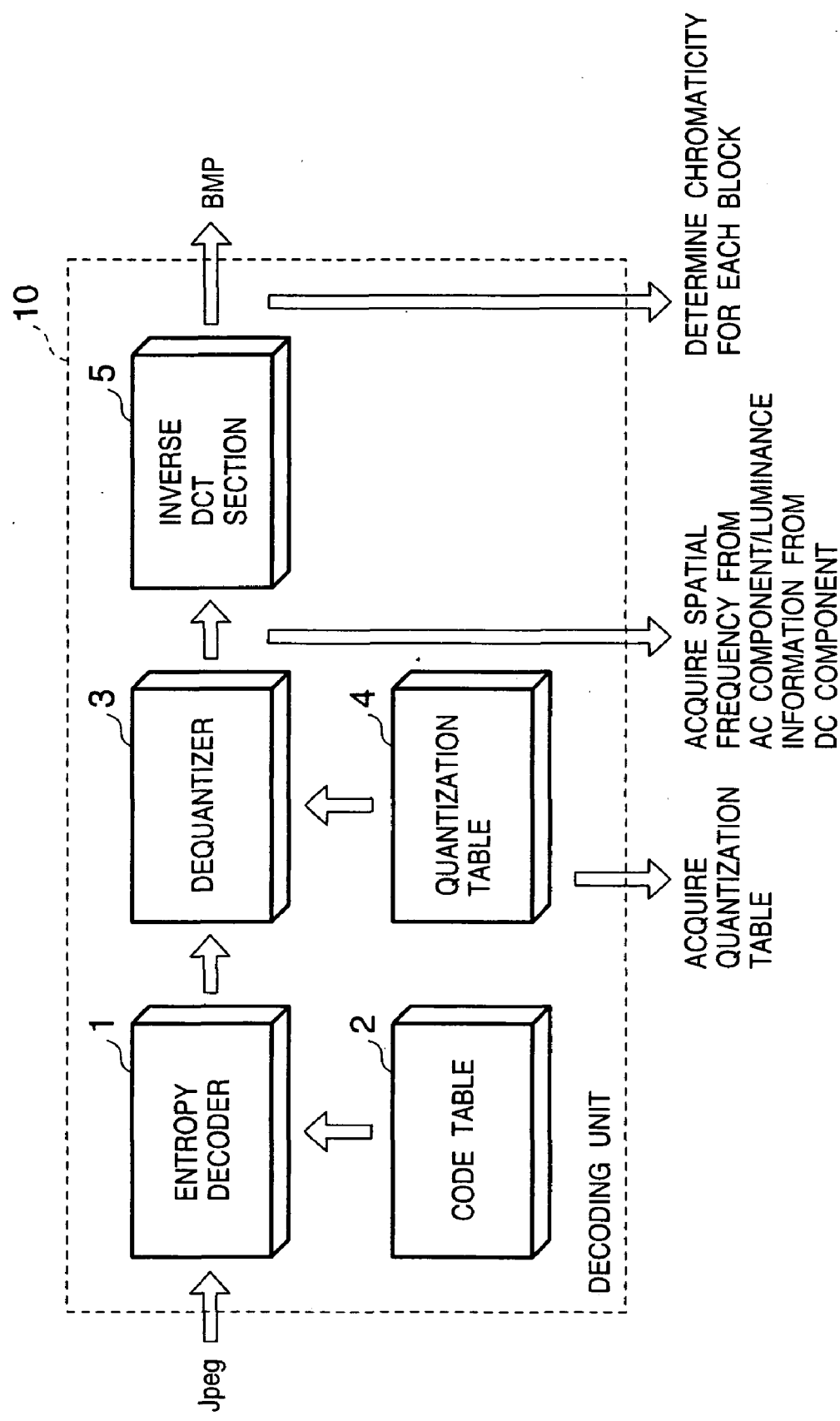

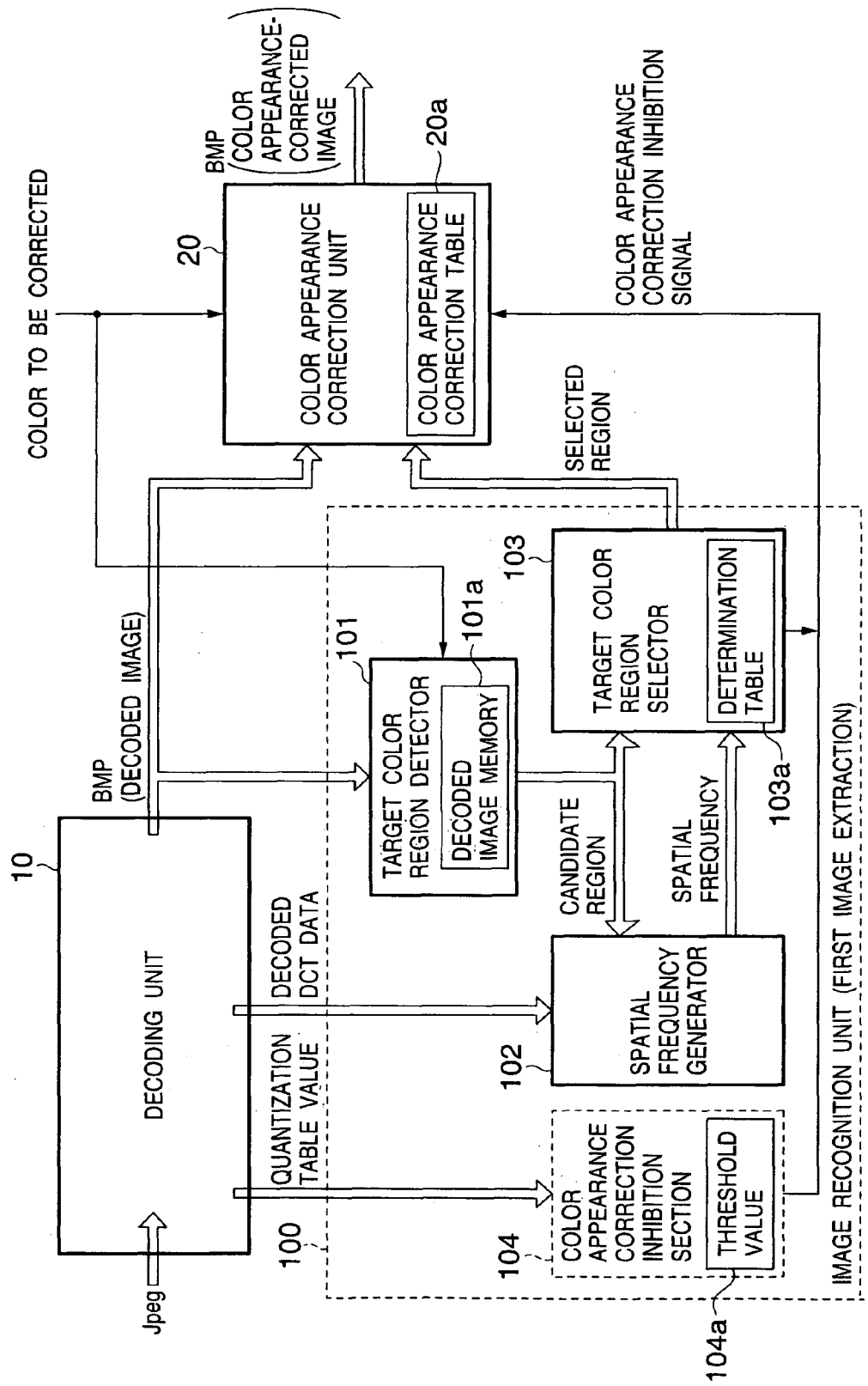

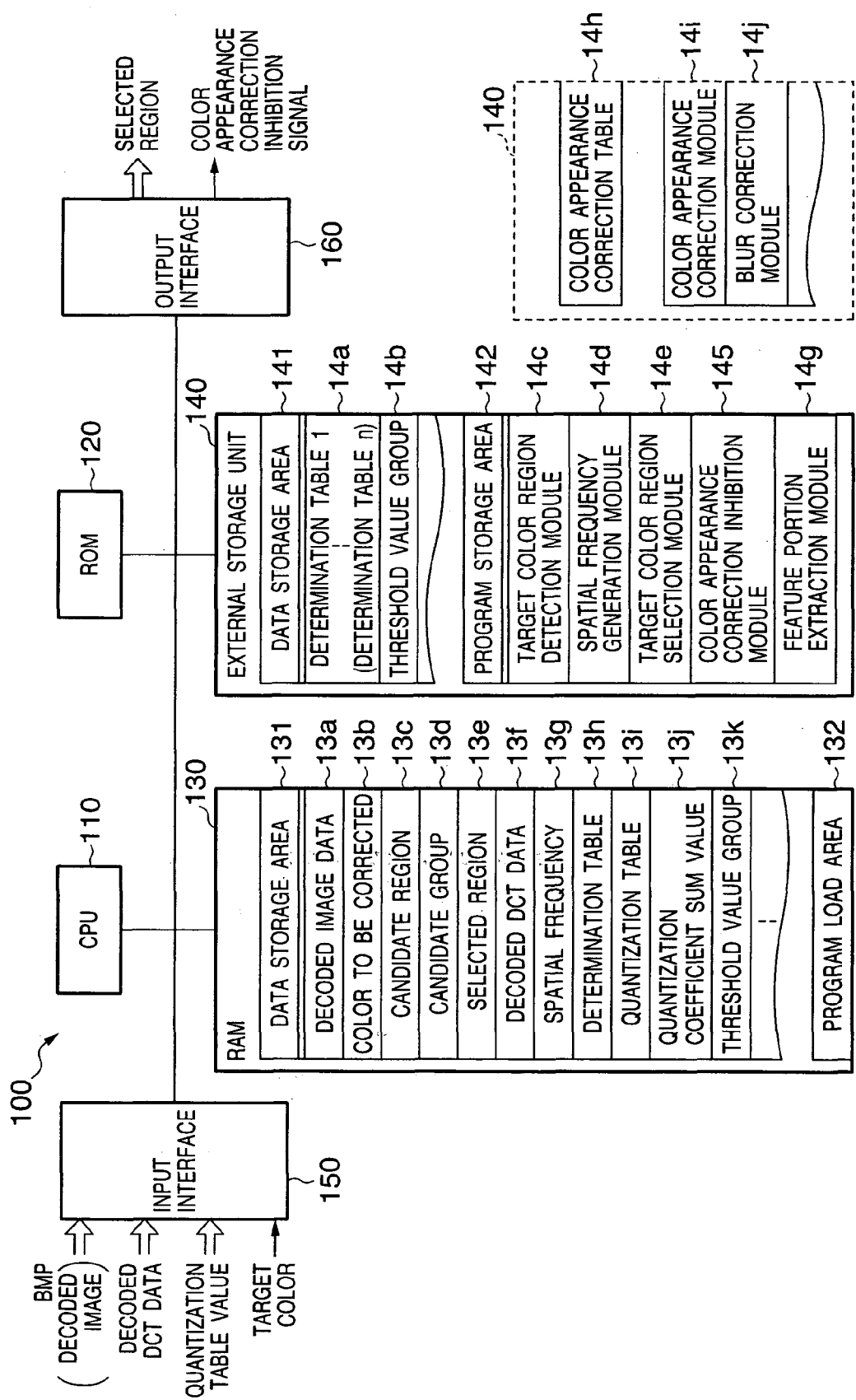

FIG. 3
**1. SEGMENT INTO 8*8 BLOCKS**
| 185 | 177 | 172 | 167 | 161 | 156 | 151 | 150 |
|---|---|---|---|---|---|---|---|
| 183 | 173 | 167 | 161 | 156 | 149 | 149 | 147 |
| 183 | 172 | 165 | 159 | 148 | 145 | 145 | 144 |
| 186 | 172 | 165 | 157 | 145 | 143 | 144 | 142 |
| 194 | 174 | 159 | 150 | 144 | 142 | 140 | 138 |
| 199 | 177 | 160 | 152 | 142 | 140 | 149 | 147 |
| 197 | 178 | 158 | 150 | 140 | 132 | 127 | 126 |
| 190 | 170 | 153 | 145 | 135 | 129 | 112 | 112 |
2. LEVEL SHIFT(−128)
| 57 | 49 | 44 | 39 | 33 | 28 | 23 | 22 |
|---|---|---|---|---|---|---|---|
| 55 | 45 | 39 | 33 | 28 | 21 | 21 | 19 |
| 55 | 44 | 37 | 31 | 20 | 17 | 17 | 16 |
| 58 | 44 | 37 | 29 | 17 | 15 | 16 | 14 |
| 66 | 46 | 31 | 22 | 16 | 14 | 12 | 10 |
| 71 | 49 | 32 | 24 | 14 | 12 | 21 | 19 |
| 69 | 50 | 30 | 22 | 12 | 4 | −1 | −2 |
| 62 | 42 | 25 | 17 | 7 | 1 | −16 | −16 |
3. DCT
| 224 | 130 | 40 | 16 | 11 | 8 | 2 | −1 |
|---|---|---|---|---|---|---|---|
| 41 | −34 | −14 | −10 | −4 | 0 | −1 | 3 |
| −7 | 10 | −12 | 2 | 2 | −5 | 1 | −1 |
| 22 | −7 | 9 | 2 | 0 | 1 | −3 | 2 |
| −8 | 4 | −6 | 3 | −1 | −2 | 4 | −1 |
| 5 | 2 | −1 | −4 | 0 | 1 | −1 | −1 |
| 4 | −5 | 3 | −1 | 0 | 2 | 0 | −1 |
| −5 | 5 | −2 | 3 | 0 | −2 | 1 | −1 |
4. QUANTIZATION TABLE
| 8 | 6 | 5 | 8 | 12 | 20 | 26 | 30 |
|---|---|---|---|---|---|---|---|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 51 |
5. QUANTIZATION
| 28 | 22 | 8 | 2 | 1 | 0 | 0 | 0 |
|---|---|---|---|---|---|---|---|
| 7 | −6 | −2 | −1 | 0 | 0 | 0 | 0 |
| −1 | 1 | −2 | 0 | 0 | 0 | 0 | 0 |
| 3 | −1 | 1 | 0 | 0 | 0 | 0 | 0 |
| −1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
⟹ ENTROPY ENCODING

FIG. 4

| VGA | 1~10 | | 11~20 | | 21~30 | | 31~40 | | 41~50 | | 51~60 | | 61~ | |
|---|---|---|---|---|---|---|---|---|---|---|---|---|---|---|
| | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL |
| ~L8 | 50 | 300 | 5 | 100 | 0 | 60 | 0 | 45 | 0 | 30 | 0 | 10 | 0 | 0 |
| L9~L20 | 50 | 190 | 5 | 60 | 0 | 30 | 0 | 20 | 0 | 10 | 0 | 0 | 0 | 0 |
| L21~ | 25 | 100 | 5 | 35 | 0 | 15 | 0 | 10 | 0 | 10 | 0 | 2 | 0 | 0 |

○ NON-DETECTED PIXEL
⊘ FLESH-COLOR PIXEL
● NON-FLESH COLOR PIXEL
☐ FLESH COLOR CONTINUOUS DETECTION CANDIDATE BLOCK

FIG. 8
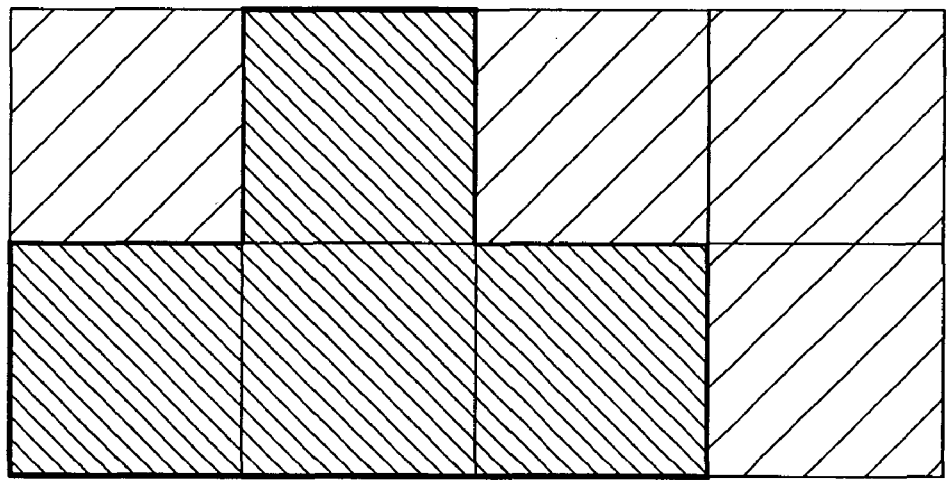
 FLESH COLOR BLOCK
DETERMINED AS CANDIDATE OF CONTINUOUS DETECTION
 NON-FLESH COLOR BLOCK
NOT DETERMINED AS CANDIDATE OF CONTINUOUS DETECTION

○ DECIMATED ROW/COLUMN PIXEL

⊘ FLESH COLOR PIXEL

● NON-FLESH COLOR PIXEL

☐ FLESH COLOR CONTINUOUS DETECTION CANDIDATE BLOCK

F I G. 20
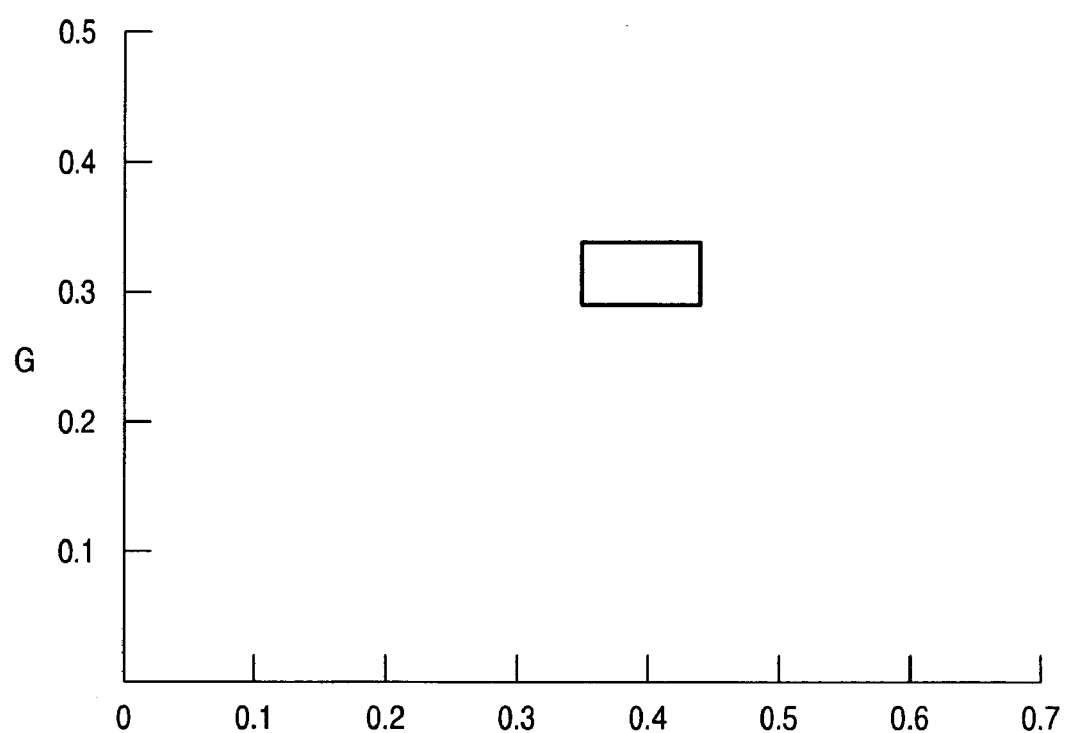

FIG. 21
ORIGINAL IMAGE
BOUNDARY BASED ON FREQUENCY

FIG. 23
ORIGINAL IMAGE
CANDIDATE GROUP DETECTION RESULT
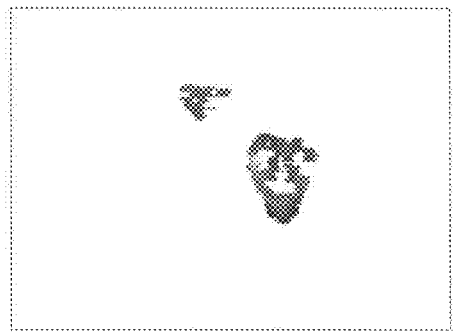

FIG. 24
NORMAL IMAGE
CORRECTION RESULT
IMAGE OF INTEREST
CORRECTION RESULT

FIG. 27

| UXGA | 1~10 | | 11~20 | | 21~30 | | 31~40 | | 41~50 | | 51~60 | | 61~ | |
|---|---|---|---|---|---|---|---|---|---|---|---|---|---|---|
| | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL |
| ~L12 | 60 | 200 | 10 | 60 | 0 | 30 | 0 | 20 | 0 | 7 | 0 | 0 | 0 | 0 |
| L13~20 | 30 | 170 | 10 | 50 | 0 | 20 | 0 | 10 | 0 | 0 | 0 | 0 | 0 | 0 |
| L21~ | 30 | 100 | 5 | 35 | 0 | 10 | 0 | 7 | 0 | 0 | 0 | 0 | 0 | 0 |

FIG. 28

Table00 : LOW IMAGE QUALITY
(HIGH COMPRESSION RATIO)

32, 33, 51, 81, 66, 39, 34, 17,
33, 36, 48, 47, 28, 23, 12, 12,
51, 48, 47, 28, 23, 12, 12, 12,
81, 47, 28, 23, 12, 12, 12, 12,
66, 28, 23, 12, 12, 12, 12, 12,
39, 23, 12, 12, 12, 12, 12, 12,
34, 12, 12, 12, 12, 12, 12, 12,
17, 12, 12, 12, 12, 12, 12, 12,

Table01 : LOW IMAGE QUALITY
(HIGH COMPRESSION RATIO)

27, 26, 41, 65, 66, 39, 34, 17,
26, 29, 38, 47, 28, 23, 12, 12,
41, 38, 47, 28, 23, 12, 12, 12,
65, 47, 28, 23, 12, 12, 12, 12,
66, 28, 23, 12, 12, 12, 12, 12,
39, 23, 12, 12, 12, 12, 12, 12,
34, 12, 12, 12, 12, 12, 12, 12,
17, 12, 12, 12, 12, 12, 12, 12,

Table02 : LOW IMAGE QUALITY
(HIGH COMPRESSION RATIO)

20, 17, 26, 41, 51, 39, 34, 17,
17, 18, 24, 39, 28, 23, 12, 12,
26, 24, 32, 28, 23, 12, 12, 12,
41, 39, 28, 23, 12, 12, 12, 12,
51, 28, 23, 12, 12, 12, 12, 12,
39, 23, 12, 12, 12, 12, 12, 12,
34, 12, 12, 12, 12, 12, 12, 12,
17, 12, 12, 12, 12, 12, 12, 12,

Table03 : LOW IMAGE QUALITY
(HIGH COMPRESSION RATIO)

18, 14, 14, 21, 30, 35, 34, 17,
14, 16, 16, 19, 26, 23, 12, 12,
14, 16, 17, 21, 23, 12, 12, 12,
21, 19, 21, 23, 12, 12, 12, 12,
30, 26, 23, 12, 12, 12, 12, 12,
35, 23, 12, 12, 12, 12, 12, 12,
34, 12, 12, 12, 12, 12, 12, 12,
17, 12, 12, 12, 12, 12, 12, 12,

Table04 : LOW IMAGE QUALITY
(HIGH COMPRESSION RATIO)

16, 11, 11, 16, 23, 27, 31, 17,
11, 12, 12, 15, 20, 23, 12, 12,
11, 12, 13, 16, 23, 12, 12, 12,
16, 15, 16, 23, 12, 12, 12, 12,
23, 20, 23, 12, 12, 12, 12, 12,
27, 23, 12, 12, 12, 12, 12, 12,
31, 12, 12, 12, 12, 12, 12, 12,
17, 12, 12, 12, 12, 12, 12, 12,

Table05 : STANDARD 12, 8, 8, 12, 17, 21, 24, 17,
8, 9, 9, 11, 15, 19, 12, 12,
8, 9, 10, 12, 19, 12, 12, 12,
12, 11, 12, 21, 12, 12, 12, 12,
17, 15, 19, 12, 12, 12, 12, 12,
21, 19, 12, 12, 12, 12, 12, 12,
24, 12, 12, 12, 12, 12, 12, 12,
17, 12, 12, 12, 12, 12, 12, 12,

FIG. 29

| Table06 | : STANDARD |
|---|---|

8, 6, 6, 8, 12, 14, 16, 17,
6, 6, 6, 8, 10, 13, 12, 12,
6, 6, 7, 8, 13, 12, 12, 12,
8, 8, 8, 14, 12, 12, 12, 12,
12, 10, 13, 12, 12, 12, 12, 12,
14, 13, 12, 12, 12, 12, 12, 12,
16, 12, 12, 12, 12, 12, 12, 12,
17, 12, 12, 12, 12, 12, 12, 12,

| Table07 | : STANDARD |
|---|---|

10, 7, 7, 10, 15, 18, 20, 17,
7, 8, 8, 10, 13, 16, 12, 12,
7, 8, 8, 10, 16, 12, 12, 12,
10, 10, 10, 18, 12, 12, 12, 12,
15, 13, 16, 12, 12, 12, 12, 12,
18, 16, 12, 12, 12, 12, 12, 12,
20, 12, 12, 12, 12, 12, 12, 12,
17, 12, 12, 12, 12, 12, 12, 12,

| Table08 | : HIGH IMAGE QUALITY |
|---|---|

6, 4, 4, 6, 9, 11, 12, 16,
4, 5, 5, 6, 8, 10, 12, 12,
4, 5, 5, 6, 10, 12, 12, 12,
6, 6, 6, 11, 12, 12, 12, 12,
9, 8, 10, 12, 12, 12, 12, 12,
11, 10, 12, 12, 12, 12, 12, 12,
12, 12, 12, 12, 12, 12, 12, 12,
16, 12, 12, 12, 12, 12, 12, 12,

| Table09 | : HIGH IMAGE QUALITY |
|---|---|

4, 3, 3, 4, 6, 7, 8, 10,
3, 3, 3, 4, 5, 6, 8, 10,
3, 3, 3, 4, 6, 9, 12, 12,
4, 4, 4, 7, 9, 12, 12, 12,
6, 5, 6, 9, 12, 12, 12, 12,
7, 6, 9, 12, 12, 12, 12, 12,
8, 8, 12, 12, 12, 12, 12, 12,
10, 10, 12, 12, 12, 12, 12, 12,

| Table10 | : HIGHEST IMAGE QUALITY (LOW COMPRESSION RATIO) |
|---|---|

2, 2, 2, 2, 3, 4, 5, 6,
2, 2, 2, 2, 3, 4, 5, 6,
2, 2, 2, 2, 4, 5, 7, 9,
2, 2, 2, 4, 5, 7, 9, 12,
3, 3, 4, 5, 8, 10, 12, 12,
4, 4, 5, 7, 10, 12, 12, 12,
5, 5, 7, 9, 12, 12, 12, 12,
6, 6, 9, 12, 12, 12, 12, 12,

| Table11 | : HIGHEST IMAGE QUALITY (LOW COMPRESSION RATIO) |
|---|---|

Table12 : HIGHEST IMAGE QUALITY
(LOW COMPRESSION RATIO)

1, 1, 1, 1, 1, 1, 1, 1,
1, 1, 1, 1, 1, 1, 1, 1,
1, 1, 1, 1, 1, 1, 1, 2,
1, 1, 1, 1, 1, 1, 2, 2,
1, 1, 1, 1, 1, 2, 2, 3,
1, 1, 1, 1, 2, 2, 3, 3,
1, 1, 1, 2, 2, 3, 3, 3,
1, 1, 2, 2, 3, 3, 3, 3,

F I G. 39
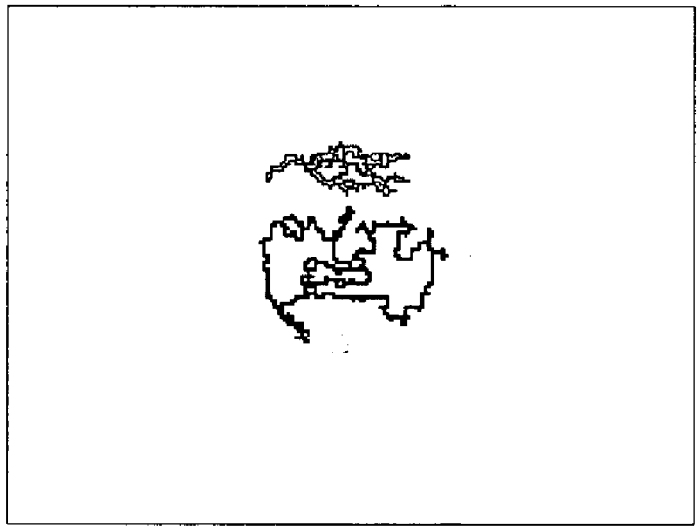

F I G. 42
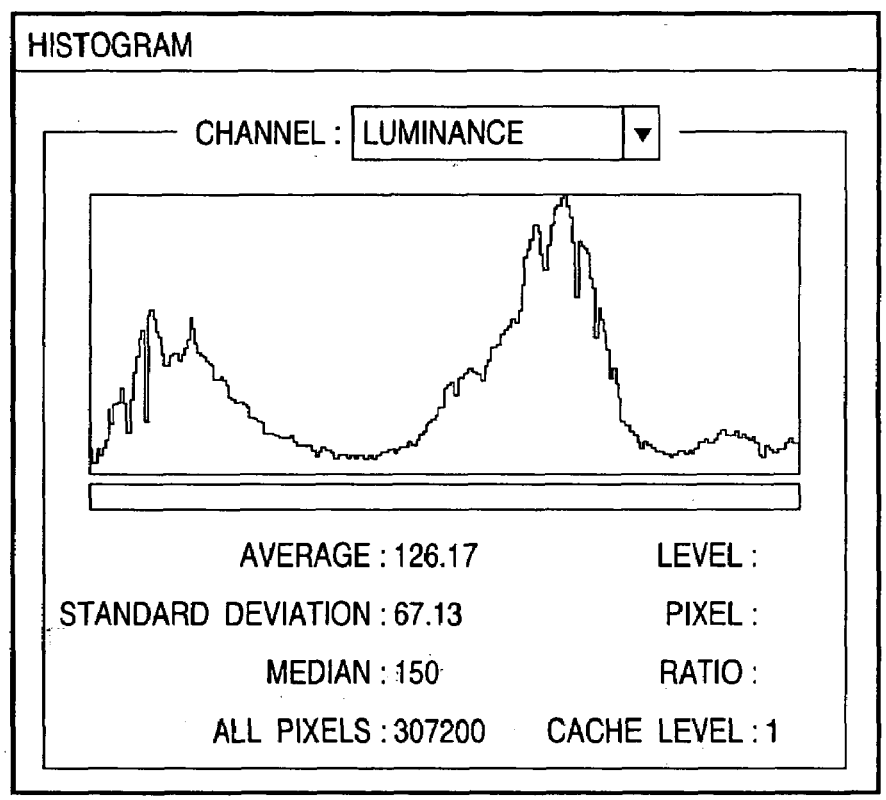

FIG. 47

|  | 1~10 | | 11~20 | | 21~30 | | 31~40 | | 41~50 | | 51~60 | | 61~63 | |
| --- | --- | --- | --- | --- | --- | --- | --- | --- | --- | --- | --- | --- | --- | --- |
|  | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL | LARGER OR EQUAL | LESS OR EQUAL |
| 10~29 | 100 | 470 | 40 | 140 | 15 | 80 | 10 | 60 | 0 | 40 | 0 | 10 | 0 | 0 |
| ~49 | 100 | 350 | 20 | 110 | 5 | 70 | 0 | 45 | 0 | 30 | 0 | 10 | 0 | 0 |
| ~99 | 50 | 300 | 10 | 90 | 0 | 50 | 0 | 40 | 0 | 20 | 0 | 10 | 0 | 0 |
| ~199 | 50 | 170 | 10 | 50 | 0 | 30 | 0 | 20 | 0 | 10 | 0 | 0 | 0 | 0 |
| 200< | 50 | 150 | 10 | 50 | 0 | 25 | 0 | 15 | 0 | 5 | 0 | 0 | 0 | 0 |

F I G. 48

| LUMINANCE CLASS | R/R+G+B | G/R+G+B |
|---|---|---|
| 0~160 | 0.35~0.44 | 0.29~0.33 |
| 161~219 | f1=0.35−(n−160)*0.02 | f2=0.35−(n−160)*0.01 |
| 220~255 | 0.33~0.42 | 0.30~0.34 |

F I G. 52
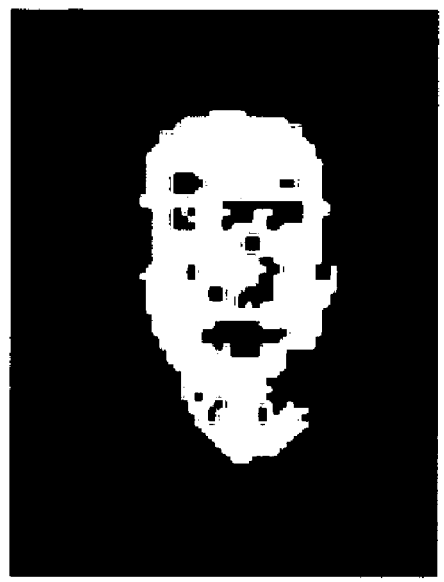

F12    F9    F7    F4
size = 22 * 12

F I G. 55
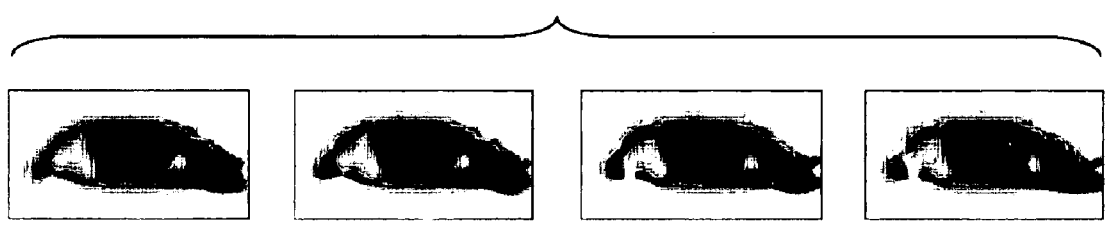
size = 22 * 12 (unsharp)

F12  F9  F7  F4 size = 22 * 12 size = 22 * 12 (unsharp)

F I G. 58
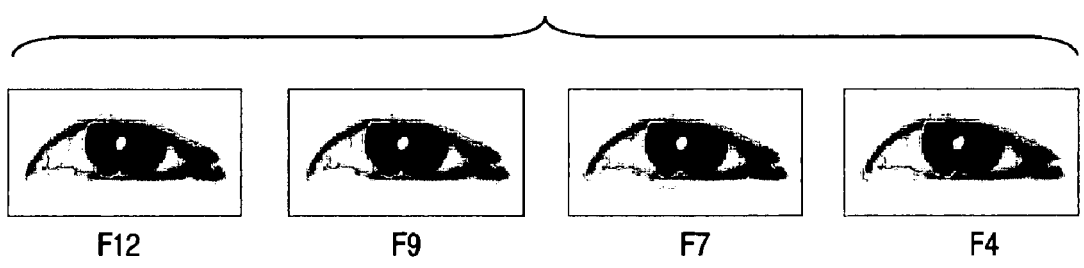
F12　　　　　F9　　　　　F7　　　　　F4
size = 88 * 48 size = 88 * 48 (unsharp)

FIG. 65

|  | QUANTIZATION FILTER | | |
|---|---|---|---|
|  | ≦500 | 500< | 1000< |
| ~6 BLOCK | MIDDLE | STRONG | STRONG |
| ~20 BLOCK | WEAK | MIDDLE | STRONG |
| ~66 BLOCK | — | WEAK | MIDDLE |

F I G. 66

| | FLESH COLOR REGION LUMINANCE RANGE | | |
|---|---|---|---|
| | 80≦ | 80<, ≦150 | 150< |
| STRENGTH | WEAK | MIDDLE | STRONG |

IMAGE AREA EXTRACTION METHOD, IMAGE RECONSTRUCTION METHOD USING THE EXTRACTION RESULT AND APPARATUS THEREOF

FIELD OF THE INVENTION

The present invention relates to an image area extraction method, an image reconstruction method and apparatus thereof, and computer program, and computer readable recording medium associated with that process and, more particularly, to a technique suitably used to extract an image area of interest from a compressed image, e.g., a JPEG file image as a compressed image data format and to reconstruct that image desirably.

BACKGROUND OF THE INVENTION

For example, a JPEG file image, which is photographed and compressed by a digital camera or the like, is reconstructed by a personal computer (PC) or the like and is displayed, is printed via a PC printer or a direct printer, or is printed by a print shop. At this time, if photographed image data has high image quality, it need only be faithfully reconstructed, and is displayed or printed, thus posing no problem.

However, some photographed image data suffer color fog, insufficient contrast, inappropriate exposure, and the like, and must undergo image correction to obtain a high-quality print result. Especially, in case of a portrait image, if that image is reconstructed and printed to have an appropriate face color, such photo leaves a favorable impression on a person who sees that photo, and photo quality can be improved. Even when a landscape or an object is photographed, an image is preferably reconstructed and printed to have an appropriate color of a target photographed object.

For example, in case of a silver halide photo, an exposure amount upon printing is preferably changed for each original image so as to obtain a high-quality photo. In order to determine the exposure amount upon printing, if a person appears in a photo, it is convenient to focus on the face color. Since it is known that the face color is a flesh (or skin) color, it is possible to determine the exposure amount so that the face color of the person who appears in the printed photo matches the flesh color.

As conventional methods for recognizing an image from an image file of digital camera, for example, "Japanese Patent Laid-Open No. 8-161497", "Japanese Patent Laid-Open No. 2000-48036", "Japanese Patent Laid-Open No. 11-238067", and the like are known.

These methods detect a similarity or coincidence level with a designated image. In case of "Japanese Patent Laid-Open No. 8-161497", a coarse coincidence level is obtained for each block of the DC component. After that, a candidate image region undergoes a reconstruction process to obtain a fine coincidence level as non-compressed data.

In case of, "Japanese Patent Laid-Open No. 2000-48036", there is disclosed an image processing apparatus which inputs or generates search data, and determines similarities between this data and a plurality of image data. Furthermore, in case of "Japanese Patent Laid-Open No. 11-238067", a query image undergoes wavelet transformation to generate a compressed image. Also, a designated image undergoes wavelet transformation to compare respective feature data, thus determining a similarity.

On the other hand, as a method of correcting an image, upon printing an image photographed by a digital camera, an application or that of a printer driver analyzes photographed data using a histogram or the like, and uniformly applies image correction such as contrast correction, white balance correction, exposure correction, and sharpness correction, and the like.

However, it is impossible for the conventional method to accurately find out an image of interest to be corrected, and to correct that image of interest to a desired color.

More specifically, when, for example, a JPEG file image photographed by a digital camera or the like is reconstructed and displayed or printed, a method of finding out an image of interest such as a person or the like from the JPEG file image to be able to correct the image of interest so that the image of interest is displayed or printed more satisfactorily like in a print process of silver halide photos must be determined.

On the other hand, a method that can attain a detection process with the possible lightest load is demanded so that a device which has low data processing performance such as a direct printer which directly prints data from a digital camera and the like can use it.

SUMMARY OF THE INVENTION

The present invention has been made in consideration of the aforementioned problems, and can detect an image of interest in an image file by a method with a lighter processing load.

The present invention can also detect an image of interest in an image file by a method with a lighter processing load irrespective of the input image size.

However, since determination methods such as chromaticity ratio determination, and feature amount determination based on AC components of DCT, which are used in determination of detection of an image of interest, are not always optimized, some images do not allow perfect extraction of an image of interest free from any losses.

In feature amount determination based on AC components of DCT, which is used in determination of detection of an image of interest, a determination table depending on a detection size class must be prepared for each image size, resulting in complicated determination tables.

The present invention can also optimize the feature amount determination method, and allow perfect extraction of an image of interest free from any losses.

The values of a quantization table associated with the compression ratio of a JPEG compressed image are not uniform depending on photographing modes or a re-save process after the edit process by an application. If a high-compression quantization table is used, the spatial frequencies in an image change extremely, and a frequency feature amount in an image of interest is influenced by such change. As a result, the detection precision may lower.

The present invention can further detect an image of interest by a method with a lighter processing load making determination using the characteristics of a quantization table upon detecting an image of interest in an image file.

Furthermore, data acquired by image of interest detection may be applied to exposure correction or the like. However, if a person face image is out of focus, information required for appropriate correction cannot often be acquired for such portion.

The present invention can still further acquire information required for appropriate correction even for a person face image or the like, which is out of focus.

The present invention provides a method of extracting an image area of interest in an inputted image comprising the steps of: acquiring spatial frequency information and chromaticity information for respective predetermined blocks from the inputted image; and searching for the image area of interest in the inputted image using the acquired spatial frequency information and chromaticity information. The inputted image comprises compressed image data, a method further comprises a step of decompressing the compressed image data, and in the acquiring step, the spatial frequency information and chromaticity information are acquired from the decompressed image data.

The present invention also provides a method of reconstructing an image from inputted compressed image data comprising the steps of: extracting an image area of interest in an inputted image having the inputted compressed image data; and reconstructing an image with correction of image data in the image area of interest to a predetermined value, wherein the extracting step comprising the steps of: acquiring spatial frequency information and chromaticity information for respective predetermined blocks from the inputted compressed image data; and searching for an image area of interest in an inputted image using the acquired spatial frequency information and chromaticity information. The predetermined value comprises a predetermined chromaticity value. The extracting step further comprises a step of decompressing the inputted compressed image data, and wherein in the acquiring step, the spatial frequency information and chromaticity information are acquired from the decompressed image data.

Further, in the present invention, a method further comprises the steps of: acquiring quantization parameters for decompression; and stopping extraction of the image area of interest in accordance with the acquired quantization parameters. The compressed image data comprises JPEG image data and the decompressed image data includes DCT coefficients and bit map data. The searching step comprises the steps of: extracting consecutive blocks having a predetermined range of chromaticity value; and determining whether or not the extracted consecutive blocks are the image area of interest based on an average of spatial frequency value within the extracted consecutive blocks. A threshold level for determining whether or not the extracted consecutive blocks are the image area of interest is changed in accordance with a size of image to be extracted. The searching step further comprises a step of selecting candidates of the image area of interest based on a number of the extracted consecutive blocks. A threshold level for selecting candidates of the image area on interest is changed in accordance with a size of image to be extracted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate embodiments of the invention and, together with the description, serve to explain the principles of the invention.

FIG. 1A is a schematic diagram showing the flow for acquiring required data upon decompressing a JPEG image according to the first embodiment of the present invention;

FIG. 1B is a block diagram showing an example of the arrangement of an image processing apparatus according to the first embodiment of the present invention;

FIG. 1C is a block diagram showing an example of the hardware and software arrangements of the image processing apparatus according to the first embodiment;

FIG. 3 shows conversion processes into the JPEG format taking 8*8 blocks as JPEG image compression units in the first embodiment as an example;

FIG. 4 shows a determination table that exploits AC component characteristics of 8*8 blocks as JPEG file image compression units in the first embodiment;

FIG. 8 shows a chromaticity detection method that exploits the DC component in 8*8 blocks as JPEG file image compression units in the first embodiment;

FIG. 20 shows the RG chromaticity distribution of a flesh color in the first embodiment;

FIG. 21 shows an example of a detection method for boundary generation based on the frequency characteristics;

FIG. 23 shows an example of a detection result image of candidate group determination in the first embodiment;

FIG. 24 shows an example of image correction comparison results using image of interest detection in the first embodiment;

FIG. 27 shows an example of a determination table for a UXGA (1600*1200) image using the AC component characteristics of 8*8 blocks as JPEG file image compression units in the first embodiment;

FIG. 28 shows an example of quantization tables used in an existing application;

FIG. 29 shows an example of quantization tables used in an existing application;

FIG. 30 shows an example of a quantization table used in an existing application;

FIG. 39 shows a region detected by executing person flesh region detection using a fixed chromaticity ratio range for the image sample shown in FIG. 38 in the first embodiment;

FIG. 42 shows a luminance histogram of the entire image sample shown in FIG. 38;

FIG. 47 shows a determination table of spatial frequency feature amounts as AC components of DCT based on the size of a candidate region in the first embodiment;

FIG. 48 shows a chromaticity ratio range table used to determine an extraction candidate region in the first embodiment;

FIG. 52 shows a region (white portion) detected by person flesh region detection of the image sample shown in FIG. 51 in the second embodiment;

FIG. 55 shows the results of an unsharp mask image process for the images shown in FIG. 54 in the second embodiment;

FIG. 58 shows images of an "eye" which are photographed to have a size of 88*48 pixels, and undergo four different save processes at high to low compression ratios "F4" to "F12" by changing the values of a JPEG quantization table in the second embodiment;

FIG. 65 is a table showing correspondence between the values of an image quantization filter and unsharp mask strengths depending on the detection region sizes in the second embodiment; and FIG. 66 is a table showing the relationship between the luminance distribution of a person flesh region and unsharp mask strengths set for an eye region as the internal region of the person flesh region.

DETAILED DESCRIPTION OF THE PREFERRED EMBODIMENTS

Preferred embodiments of a compressed image reconstruction method and apparatus thereof, and an image recognition method, image recognition apparatus, computer program, and computer readable recording medium associated with that process according to the present invention will be described hereinafter with reference to the accompanying drawings.

This embodiment will exemplify a case wherein a JPEG file image as a compressed image data format is recognized and is reconstructed desirably. However, the present invention is not limited to JPEG compression, and can be widely applied to compression techniques, which can extract the spatial frequency of an image from symbol data (DCT coefficients in this embodiment) during compression process like in the present invention. Also, this embodiment will mainly exemplify a case wherein, especially, a JPEG file image is reconstructed and printed. However, the present invention is the reconstruction and output (including display and print) techniques, and includes them.

Figure 2:
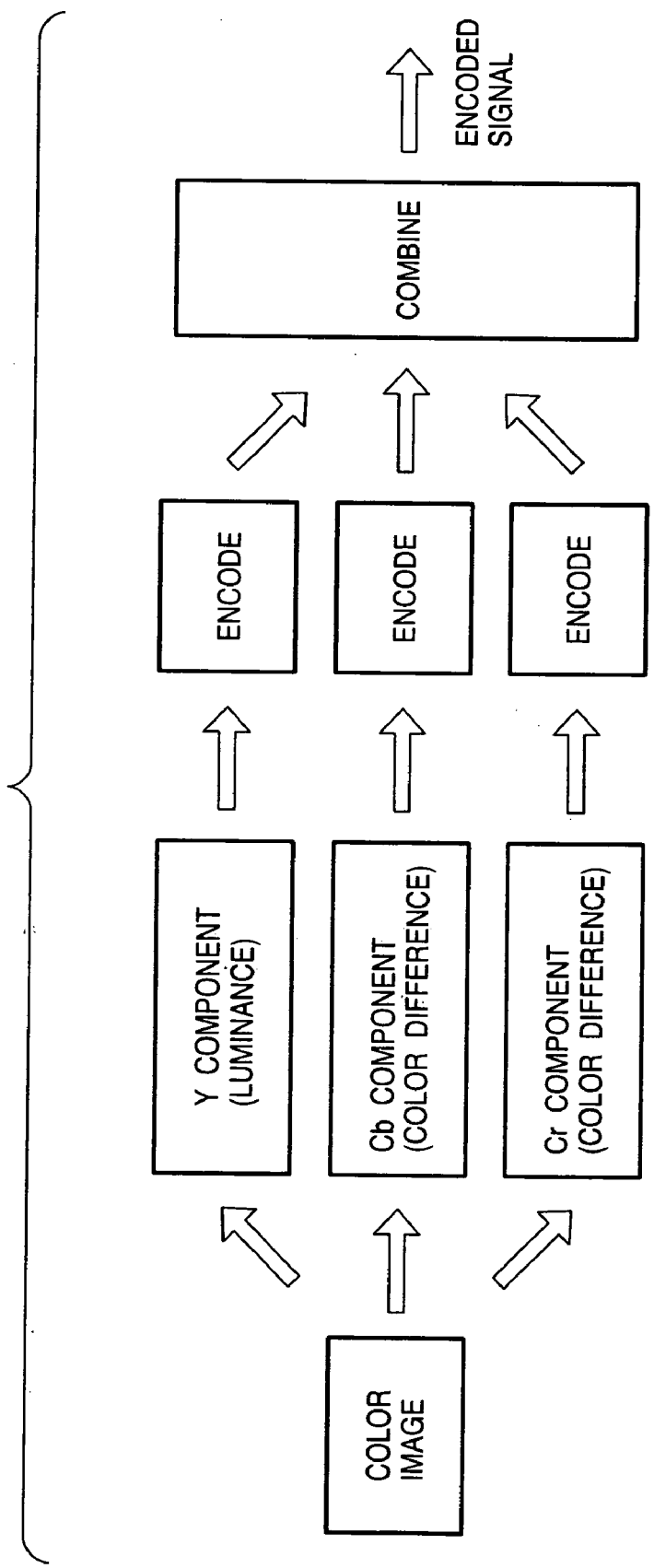
FIG. 2 is a schematic diagram showing the flow of processes upon converting image data into a JPEG format in the first embodiment.

Example of Compressed Encoded Data to be Decoded and Reconstructed by this Embodiment Initially, information omission and encoding/decoding of a "JPEG file" as a most popular compressed image file will be described below with reference to FIGS. 2 and 3.

As for encoding, it is a common practice for a digital still camera, digital video camera, or the like to save a still image as a JPEG file. In this case, an input signal from a CCD or the like as a light-receiving element of an input device is A/D-converted, and digital data is stored in a frame memory. Then, RGB or CMY filter information is converted into luminance information and chromaticity information. After that, such information is segmented into 8*8 (64) square pixel blocks.

1. SEGMENT INTO 8*8 BLOCKS of FIG. 3 shows a data example for one of 8*8 blocks obtained by segmenting a bitmap of luminance data. 2. LEVEL SHIFT (−128) of FIG. 3 shows an example wherein pixel values ranging from 0 to 255 are converted into signals ranging from −128 to 128 by level shift. 3. DCT of FIG. 3 shows an example wherein DCT coefficients are calculated by DCT (discrete cosine transformation)

4. QUANTIZATION TABLE of FIG. 3 is a quantization table which omits many high frequency components in consideration of the visual characteristics. In this example, the DCT coefficients as results of 3. DCT of FIG. 3 are quantized using this table.

5. QUANTIZATION of FIG. 3 shows the quantization results. When these values are entropy-encoded and are expressed by Huffman codes, compressed data as an encoded signal is generated.

Upon decoding, processes opposite to the aforementioned encoding processes are executed. That is, the encoded signal is decoded to obtain quantized DCT coefficients. Then, the quantization table is multiplied to dequantize the quantized DCT coefficients, thus obtaining DCT coefficients. The DCT coefficients undergo inverse DCT to reclaim a level-shifted image. Furthermore, by adding an inverse level shift value "128", an image for one block is decoded.

In the above description, a process for converting into an RGB image by combining data segmented into luminance information and chromaticity information is omitted. In the flow of encoding, as shown in FIG. 2, a color image is converted into a luminance component (Y) and two chromaticity components (Cb, Cr), and these components are encoded and combined to generate compressed image data.

As methods of printing a JPEG Image as the compressed image data file described above, there are some choices. That is, compressed image data from an input device is transferred to a personal computer (to be referred to as a PC hereinafter) via a USB or storage medium. After an image is decompressed, image correction is applied to that image as needed, and data is then sent to a printer. Alternatively, image data from an input device is directly input to a printer, and is decompressed in the printer. Then, image correction is applied to that image as needed, and the image is printed.

In any case, in order to print a high-quality image, whether photographed image data has high quality or requires correction must be determined to be classified into a high-quality image to be faithfully printed, and an image which must undergo correction to improve its quality before a print process.

The conditions of a high-quality image are as follows:
1) White balance is good.
2) Contrast is appropriate.
3) Gray levels are assigned to a required portion.

That is, an appropriate exposure value is set.
4) Saturation is appropriate.
5) A finish as high as a silver halide photo is obtained.
6) An image of interest such as a person or the like is mainly corrected.

Even in commercially available PC printers and direct printers which print without PCs, corrections of items 1) to 5) are made to varying degrees. Also, correction of an image of interest of item 6) is not made since detection of the image of interest requires a heavy process, and that detection method is not established yet.

Especially, it is difficult for a direct printer or the like with poor processing performance to practice such detection. However, the present invention solves this problem. As such means, a method of executing the overall image correction via detection of the presence/absence of an image of interest in a JPEG image file, and confirmation of the necessity/unnecessity of correction for the detected image is available.

Example of Arrangement of Image Processing Apparatus of First Embodiment

An example of the arrangement of the image processing apparatus of the first embodiment will be described using a block diagram.

FIG. 1A is a block diagram of a decoding unit 10 showing the decompression process of a JPEG file, and information to be acquired during that process.

In a process for converting a JPEG file into RGB bitmap data, an entropy decoder 1 executes entropy decoding using a code table 2. A quantization table 4 which is used in dequantization of a dequantizer 3 is stored as data, and dequantization is made.

Dequantized data have been frequency-converted as data for respective blocks, and are acquired as those required to obtain image frequency characteristics. After that, an inverse DCT section 5 executes an inverse DCT process and inverse level shift process to attain Ycc—RGB conversion, thus rasterizing to normal RGB bitmap data.

FIG. 1B is a block diagram showing an example of the arrangement of the image processing apparatus of this embodiment which includes the decoding unit 10.

The image processing apparatus of this embodiment comprises the decoding unit 10, an image recognition unit (which executes first image extraction) for recognizing an image region to be corrected on the basis of data acquired from the decoding unit 10, and a color appearance correction unit 20 for correcting a recognition region from the image recognition unit 100 to a desired color. A reconstructed, corrected image (BMP) which is output from the color appearance correction unit is sent to and printed by a printer.

The image recognition unit 100 comprises a target color detector 101 for receiving a decoded image (BMP) from the decoding unit 10 detecting a region of a designated target color (flesh color in this embodiment), a spatial frequency generator 102 for receiving decoded DCT data from the decoding unit 10 and generating the spatial frequencies in candidate regions of the target color detected by the target color detector 101, and a target color region selector 103 for selecting a region which is to undergo color appearance correction from the candidate regions of the target color detected by the target color detector 101 on the basis of the spatial frequencies. The target color detector 101 has a decoded image memory 101a for storing a decoded image. The decoded image memory 101a need not be arranged in the target color detector 101 but may be commonly used by other processors. The target color region selector 103 has a determination table 103a for selection. A plurality of such determination tables 103a may be prepared in correspondence with image sizes.

The image recognition unit 100 further comprises a color appearance correction inhibition section 104 for receiving quantization table values from the decoding unit 10 and inhibiting a color appearance correction process in accordance with a determination result based on an inhibition threshold value 104a, so as to improve the process of this embodiment.

The color appearance correction unit 20 executes a known color correction process of the color of the selected region selected by the image recognition unit 100 to the correction target color (flesh color in this embodiment) using, e.g., a color correction table 20a or the like. This color appearance correction process is inhibited by a color appearance correction inhibition signal from the target color region selector 103 or color appearance correction inhibition section 104 under a predetermined condition. This correction process may be applied to the entire image for the sake of simplicity. If such process is made to improve the image quality, different corrections depending on a region or spatial correction may be applied. Since a characteristic feature of the present invention does not lie in such color appearance correction method, a brief description will be given in this embodiment.

FIG. 1C is a block diagram showing an example of the hardware and software arrangements which implement the image process of this embodiment. Note that FIG. 1C mainly explains the image recognition unit 100 as a characteristic feature of this embodiment. This apparatus can be implemented by a versatile computer or may be implemented by a dedicated computer.

Reference numeral 110 denotes a CPU for an arithmetic process; 120, a ROM which stores permanent data and programs (including an OS, BIOS, and the like) used by the CPU 110; and 130, a RAM which temporarily stores data and programs used by the CPU 110 in this embodiment. In this embodiment, an application program is loaded from an external storage unit 140 (to be described later) onto a program load area 132 of the RAM 130, and is then executed by the CPU 110.

A data storage area 131 of the RAM 130 includes a decoded image data area 13a for storing a decoded image decoded by the decoding unit 10 or a reconstructed image that has undergone color appearance correction, a correction target color area 13b for storing correction target color (flesh color in this embodiment) data, a candidate region storage area 13c for storing detected target color regions, a candidate group area 13d for storing a candidate group formed of candidate regions, a selected region storage area 13e for storing a finally selected region, a decoded DCT data storage area 13f for storing decoded DCT data from the decoding unit 10, a spatial frequency area 13g for storing the generated spatial frequency, a determination table area 13h for storing the determination table used to select the target color region, a quantization table area 13i for storing the quantization table from the decoding unit 10, a quantization coefficient sum value storage area 13j for storing a value obtained by summing up coefficients in the quantization table, and an area 13k for storing a threshold value group used in a color appearance correction inhibition process, and the like.

Reference numeral 140 denotes an external storage unit which comprises a large-capacity or removable medium such as a disk, memory card, or the like, and includes a floppy disk, CD, and the like.

A data storage area 141 of the external storage unit 140 stores determination tables 1 to n 14a and a threshold value group 14b. Also, the data storage area 141 may store a database that stores other parameters, image data, and the like. A program storage area 142 roughly stores an object color region detection module 14c, spatial frequency generation module 14d, target color region selection module 14e, color appearance correction inhibition module 14f, and feature portion extraction module 14g to be executed by the second embodiment (to be described later).

Furthermore, the apparatus shown in FIG. 1C can also serve as the decoding unit 10 and/or color appearance correction unit 20. In such case, a color appearance correction table 14f as data, and a color appearance correction module 14i and a blur correction module 14j used in the second embodiment (to be described later) as programs may be stored.

Reference numeral 150 denotes an input interface which inputs, from the decoding unit 10, decoded data (BMP), decoded DCT data, quantization table values, and target color data which is unique to the apparatus or can be externally designated, in this embodiment. Reference numeral 160 denotes an output interface which outputs a selected region or a color appearance correction inhibition signal. If this apparatus also serves as the color appearance correction unit, the output is color appearance-corrected image data (BMP). Furthermore, this apparatus can also serve as the decoding unit 10. In such case, JPEG data is input, and color appearance-corrected image data (BMP) is output. Also, other data and programs are prepared in this case.

Figure 6:
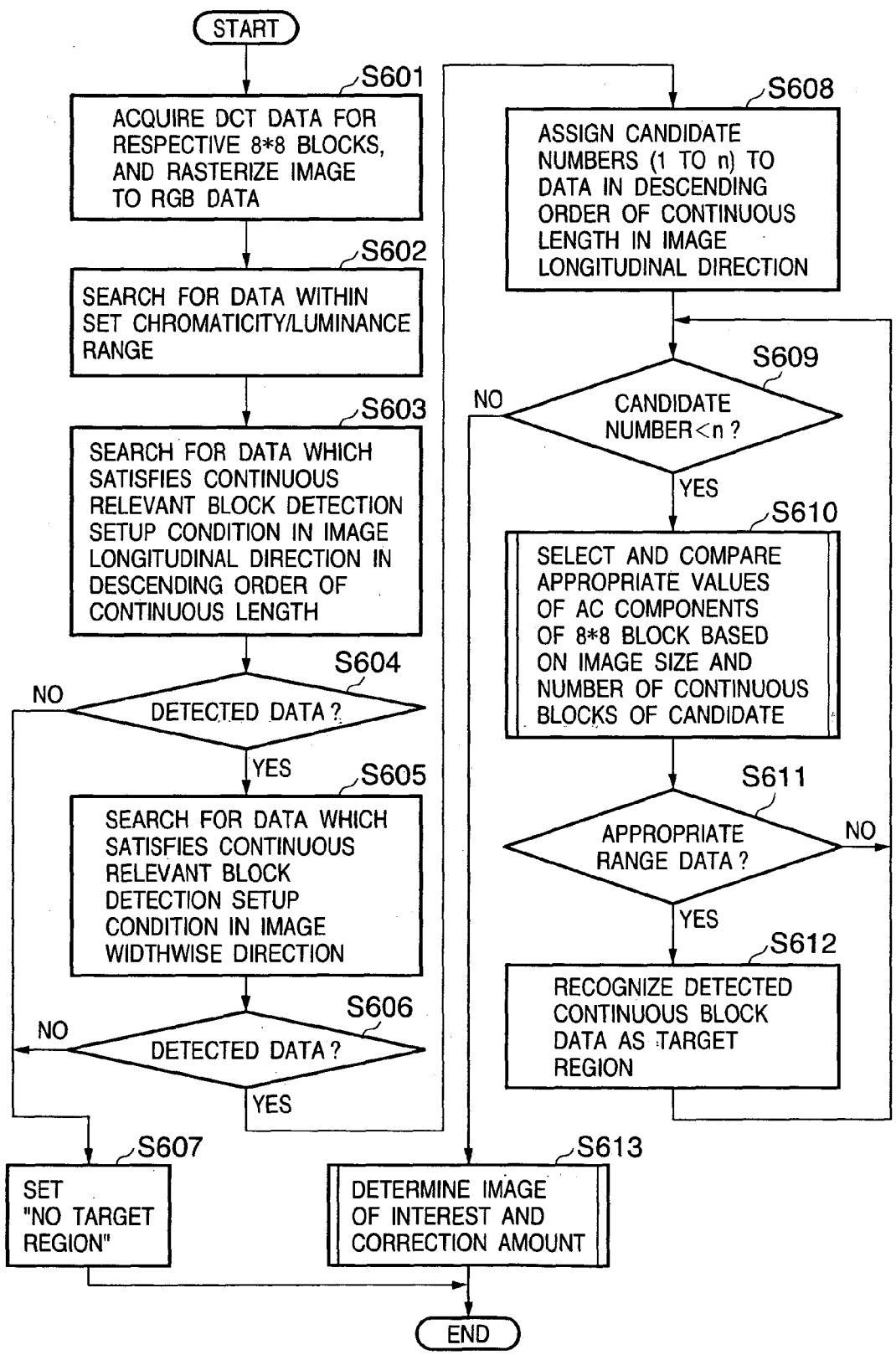
FIG. 6 is a flow chart of an image of interest detection process that starts from decompression of a JPEG image in the first embodiment.

Example of Operation Sequence of Image Processing Apparatus of First Embodiment FIG. 6 is a flow chart of person detection as image of interest detection which is most important in this image process.

The detection process shown in FIG. 6 is roughly divided into two stages. In the first stage including steps S601-S608, regions where the chromaticity ratio corresponds to defined chromaticity of an object to be detected, and other regions are separated from the entire image for respective 8*8 pixel blocks as compression units, and neighboring blocks in lengthwise direction of an image (in horizontal direction of a long-sideways image as FIGS. 10 and 14) are grouped to generate candidate groups. In the second stage including steps S609-S613, it is determined if the average value of AC components of DCT of each candidate group corresponding to the defined chromaticity ratio falls within the defined feature amount range of the object to be detected to extract an image area of interest based on the fallen candidate group.

Example of Processing in the First Stage

In step S601, DCT data for respective blocks each consisting of 8*8 pixels, and a quantization table are acquired, and an image file is rasterized to RGB bitmap data.

Example of Detecting Block Having Chromaticity of Flesh Color

The flow advances to step S602 to conduct a search to see if each of 8*8 pixel blocks in the RGB bitmap data corresponds to the chromaticity of the flesh color of a person as an image of interest in this embodiment.

In this case, the ratio of an image of each 8*8 pixel block to the entire image differs depending on the input image size. Hence, a unit is set in proportion to the input image size. For example, a unit for eight blocks (=4 blocks in lengthwise direction×2 blocks in widthwise direction) in a VGA (640*480) image or that for 20 blocks (=5 blocks in lengthwise direction×4 blocks in widthwise direction) in a UXGA (1600*1200) image is set.

Figure 5:
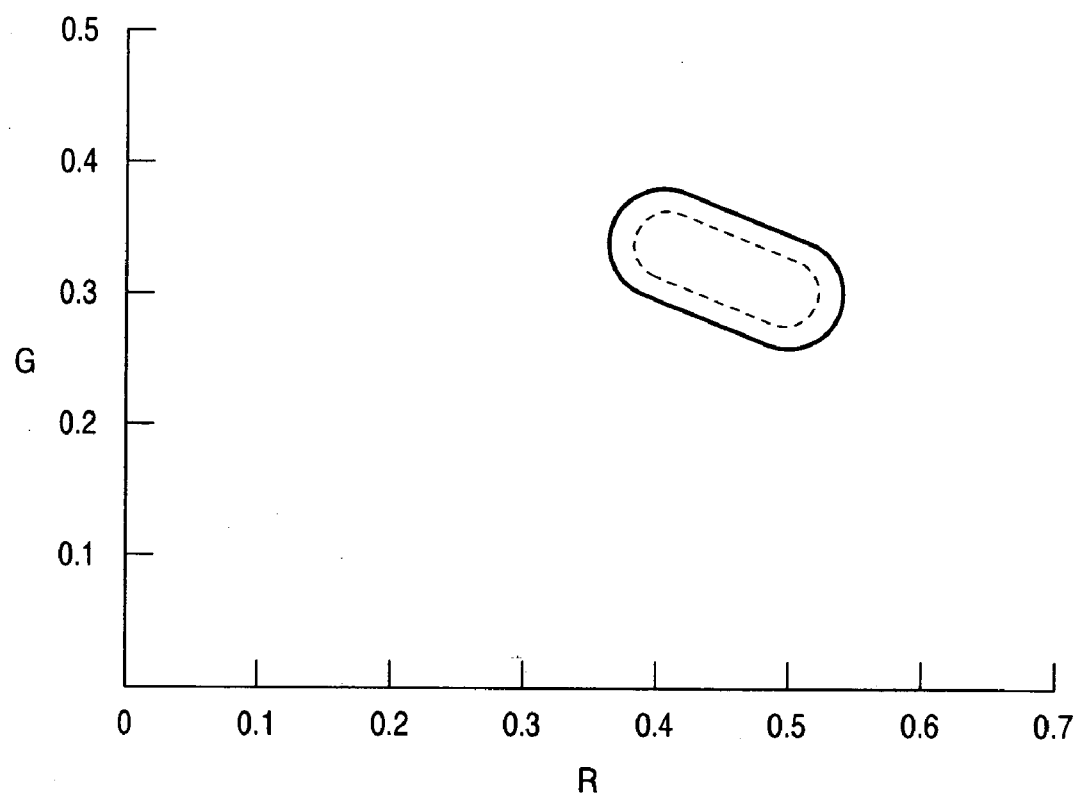
FIG. 5 shows RG chromaticity distribution example of a given flesh color in the first embodiment.

A plurality of chromaticity search methods are available. Known methods include:

1) a method of searching for chromaticity data in which a ratio B (blue)/G (green) falls within the range from 0.7 to 0.8 and a ratio R (red)/G (green) falls within the range from 1.4 to 1.8; and 2) a method of expressing a flesh color using a probability ellipse, as shown in FIG. 5. The probability ellipse can be calculated by:

$$r = \frac{R}{R+G+B}, g = \frac{G}{R+G+B} \quad (1)$$

$$2(1-a^2)\eta \geq \frac{(r-\bar{r})^2}{\sigma_r^2} - 2a\frac{(r_i-\bar{r}) \times (g-\bar{g})}{N \times \sigma_r \times \sigma_g} + \frac{(g-\bar{g})^2}{\sigma_g^2} \quad (2)$$

where (3)

$$a = \sum_{i=1}^{N} \frac{(r_i - \bar{r}) \times (g_i - \bar{g})^2}{N \times \sigma_r \times \sigma_g}$$

r and g are the average values of flesh color chromaticity, and $\sigma_r^2$ and $\sigma_g^2$ are variances. Also, $\eta$ is a coefficient that represents the probability, and $\eta=2.0$, $\eta=1.5$, and $\eta=1.0$ respectively correspond to 95%, 84%, and 68% probability ellipses.

In this embodiment, a chromaticity distribution range which considers simplicity of a process and is given by:

$$r = \frac{R}{R+G+B} = 0.35 \sim 0.44 \quad (4)$$

$$g = \frac{G}{R+G+B} = 0.29 \sim 0.33$$

is adopted as a flesh color chromaticity range. FIG. 20 shows this range.

Since this embodiment extracts the features of frequency components in an image from respective 8*8 pixel blocks, chromaticity determination is also done for respective 8*8 pixel blocks for the sake of structural and logical simplicities.

Figure 7:
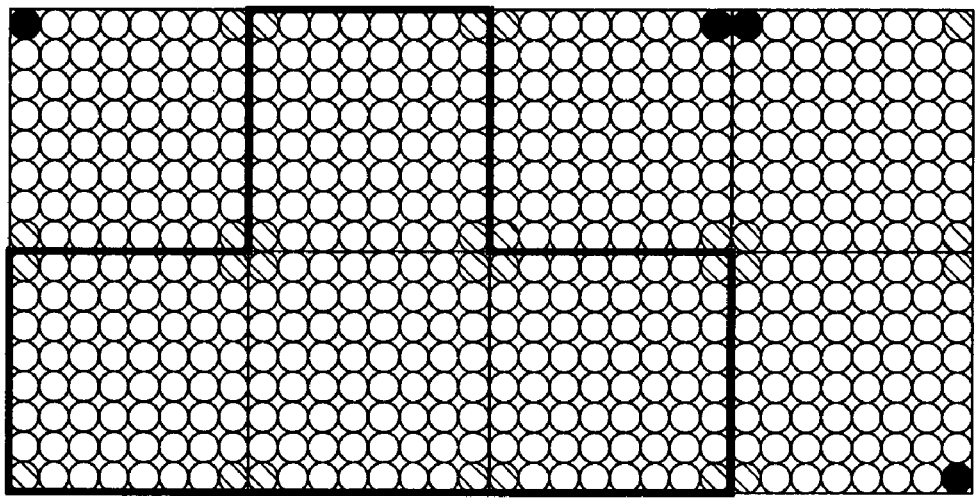
FIG. 7 shows a chromaticity detection method in 8*8 blocks as JPEG file image compression units in the first embodiment.

FIG. 7 illustrates chromaticity detection points used in this embodiment. As shown in FIG. 7, it is confirmed whether or not all chromaticity values at four corners of each block of "8*8 pixels" fall within a given chromaticity range. If all chromaticity values fall within the range, it is determined that the block has optimal chromaticity values.

In FIG. 7, the second block from the left end of the upper column and the first, second, and third blocks from the left end of the lower column are optimal. In the leftmost block of the upper column, it is determined that the upper left chromaticity value of four points is a non-flesh color pixel, and the block including this pixel falls outside the flesh color range. Likewise, the first and second blocks from the right side of the upper column, and the rightmost block of the lower column fall outside the range.

FIG. 8 shows a determination method based on the average chromaticity of the entire block of "8*8 pixels". As methods for calculating the average chromaticity in the block, a method of calculating the average chromaticity from DC components in chromaticity data (Cb, Cr) before computing the inverse DCTs during decomposition may be used in addition to the method of calculating the average value of all pixel values in the 8*8 block. Since this method can determine chromaticity based on the color appearance of the entire block, higher precision is expected compared to a method using a fewer detection points. The contents of detection of only chromaticity in a natural image will be explained below.

Figure 9:
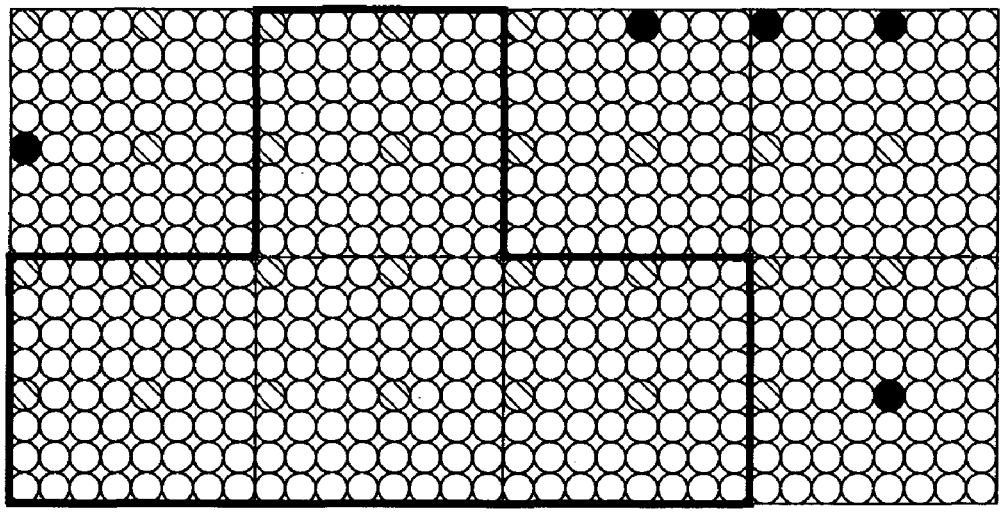
FIG. 9 shows a detection state in 8*8 blocks upon chromaticity detection using 3-bit decimation in the first embodiment.

FIG. 9 shows substantially the same detection method as in FIG. 7, except that detection points in the entire image are set at equal intervals.

Figure 10:
FIG. 10 shows a first example of a JPEG image sample for detection in the first embodiment.
Figure 11:
FIG. 11 shows an example of a BMP file as a result of detection from the first image sample based on only the chromaticity.
Figure 14:
FIG. 14 shows a second example of a JPEG image sample for detection in the first embodiment.
Figure 15:
FIG. 15 shows an example of a BMP file as a result of detection from the second image sample based on only the chromaticity.

FIG. 10 shows a general portrait photo, and FIG. 14 shows a photo of a dead tree grove having a similar chromaticity range as the flesh color chromaticity of a person. FIGS. 11 and 15 show the results obtained by executing detection of pixels in FIGS. 10 and 14 based on only the chromaticity conformity.

As can be seen from the detection result of the portrait shown in FIG. 11, a flesh color portion of a person is well detected, but pixels that satisfy optimal chromaticity values are also detected from smaller portions like dust or the like in a fence and background. For this reason, an image of interest cannot be specified by chromaticity alone.

In FIG. 14, a dead tree grove having the same chromaticity values is detected on the entire surface although detection is made for the purpose of detecting a person flesh color. In this way, when chromaticity determination is made on the pixel level, it is impossible to specify an image of interest.

When detection is done on the block level, since a specific cluster is used as an object to be detected, such object is immune to foreign noise.

Improved Example of Detecting Block Having Chromaticity of Flesh Color

Figure 35:
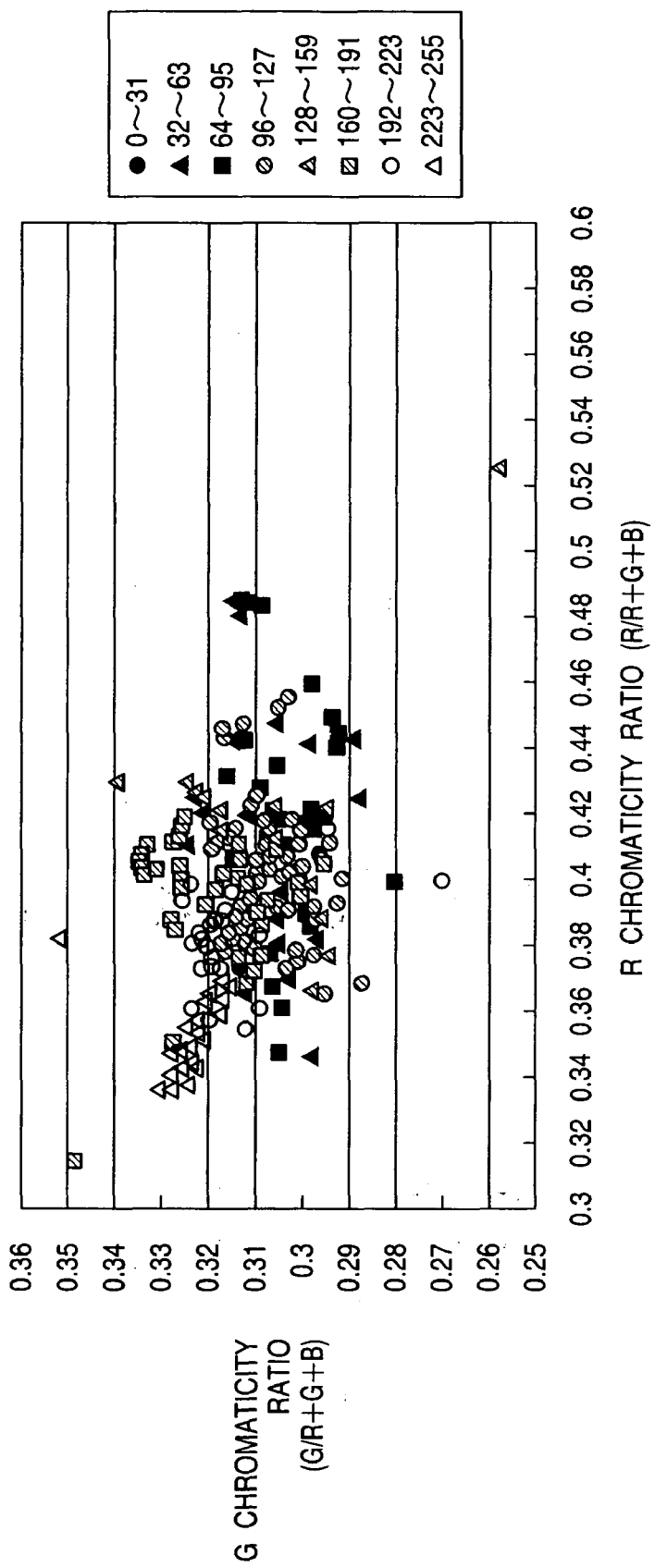
FIG. 35 is a graph showing the distribution state of the person flesh region chromaticity ratios in a plurality of images, which are classified using the average luminance values of detection regions in the first embodiment.

FIG. 35 is a graph that plots the average chromaticity ratios of a plurality of person flesh regions taken by a digital camera. The abscissa plots the chromaticity ratio of red components, i.e., the average value of values calculated by "R/R+G+B" for respective 8*8 blocks in the whole detection region. The ordinate plots the chromaticity ratio of green components, i.e., the average value of values calculated by "G/R+G+B" for respective 8*8 blocks in the whole detection region. In this graph, the average luminance of each region is equally divided into eight classes in association with the chromaticity ratio of the region.

In this embodiment, the optimal chromaticity ratio range is set as follows.

Chromaticity ratio of red component: "0.35 to 0.44"
Chromaticity ratio of green component: "0.29 to 0.33"

As can be seen from the results of this graph, most of the ratios fall within the definition range, but some ratios fall outside the definition range depending on light sources since the person flesh color is defined by reflected light. In this graph, a distribution with luminance values of 160 or higher should be noted. Especially, in regions which are classified to the highest luminance range from 223 to 255, it is recognized that the distribution shifts from the definition range in a white direction as the upper left direction.

Figure 38:
FIG. 38 shows an image sample which suffers highlight saturation within a person face region in the first embodiment.

FIG. 38 shows an image sample of an object having a high-luminance region as a person flesh. FIG. 42 shows the luminance distribution of this image.

In FIG. 42, the abscissa plots the luminance range expressed by levels 0 (left end) to 255 (right end). The ordinate plots the distribution of pixels having luminance components in an image. A left small peak corresponds to a coat portion with lower luminance levels. A right large peak near the center corresponds to a paved road has the largest occupied area. The rightmost portion corresponds to the distribution of luminance information of a face of a person.

When this image (FIG. 38) undergoes group detection based on the chromaticity ratio in primary extraction using the definition of the above embodiment, a result shown in FIG. 39 is obtained. FIG. 39 reveals that, in consideration of the person flesh region in FIG. 38, the red components overflow due to an increase in luminance to fall outside the chromaticity ratio adaptive range, thus causing highlight saturation. This region can be used as information used in exposure correction but the face region of the person flesh is insufficiently detected if it is used in blur correction or the like.

Figure 40:
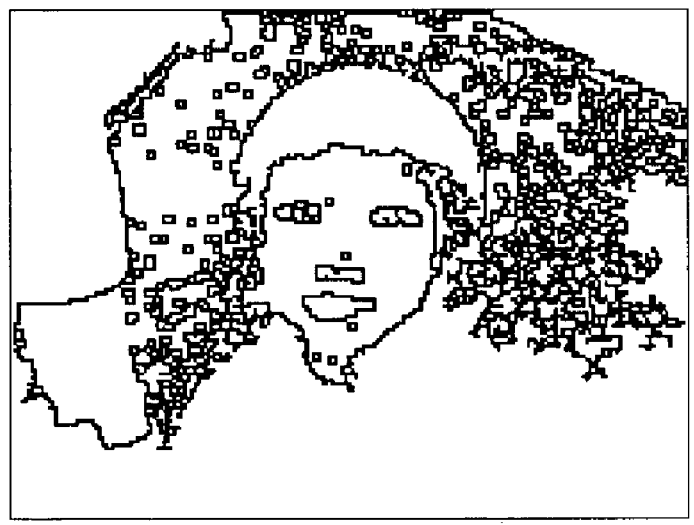
FIG. 40 shows a result of person flesh region detection using an extended definition of an optimal chromaticity ratio range for the image sample shown in FIG. 38 in the first embodiment.

FIG. 40 shows the result obtained when the chromaticity ratio adaptive ranges are merely broadened as follows.

Chromaticity ratio of red component: "0.33 to 0.46"
Chromaticity ratio of green component: "0.27 to 0.35"

When the chromaticity ratio adaptive ranges are merely broadened, the person flesh region can be detected, but the chromaticity ratio of the paved road is also adopted, and a region other than an image of interest is detected. Hence, a good effect cannot be consequently achieved.

FIG. 48 defines the chromaticity ratio adaptive range of a person flesh using luminance classes in consideration of the range of an input image so as to solve the above problem.

In this definition, the same chromaticity ratio range as in the above definition is adopted up to luminance=160. In order to cope with a shift of the detected chromaticity range of the person flesh with increasing luminance, the following ranges are set for luminance=220 or higher.

Chromaticity ratio of red component: "0.33 to 0.42"
Chromaticity ratio of green component: "0.30 to 0.34"

Within the luminance range from 161 to 219, the ranges are specified by calculations using primary equations.

Figure 41:
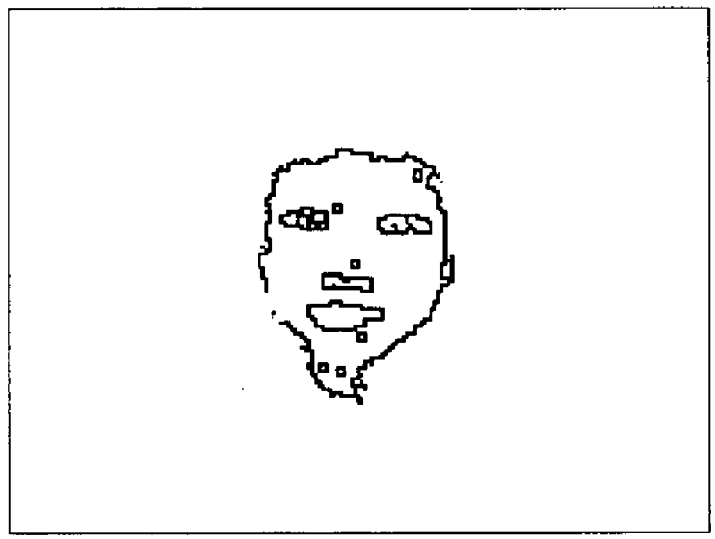
FIG. 41 shows a result of person flesh region detection using a definition of an optimal chromaticity ratio range depending on the luminance value for the image sample shown in FIG. 38 in the first embodiment.

FIG. 41 shows the detection result of FIG. 38 using this method. In this embodiment, the chromaticity ratio adaptive range remains the same even in the high-luminance region. However, since objects present in the natural world other than the person flesh increase as the chromaticity ratio approaches white, the adaptive range in the high-luminance region may be narrowed down to prevent detection errors.

Example of Extracting Candidate Area by Continuous Detection of Flesh Color Blocks A block of 8*8 pixels is not always the size of an appropriate cluster to detect an area of fresh color in step S602. Hence, in block detection based on chromaticity, conditional detection, i.e., continuous detection of vertically and horizontally neighboring blocks is done to improve the precision.

In this case, a continuous range is set under the condition that it is used to determine even a person flesh color region to fall outside a range, i.e., to be noise if it does not have a data size which allows to recognize a face on a print.

This portion corresponds to the processes in step S603 and subsequent steps in FIG. 6. That is, in step S603, chromaticity detection is made for respective blocks in the lengthwise direction of an image (in horizontal direction of a long-sideways image as FIGS. 10 and 14) to search for candidates in descending order of the number of continuously detected blocks.

It is compared in step S604 if that continuous length is equal to or larger than that corresponding to an image of interest. In the example, the continuous length of blocks is 2 blocks at VGA or 4 blocks at UXGA. If relevant continuous blocks are found as a result of comparison, the flow advances to step S605 to search the image for data that satisfies a block continuous detection setup condition in the widthwise direction. In the example, the continuous length of blocks is 2 blocks at VGA or 4 blocks at UXGA.

It is checked in step S606 if detected data are present. If detected data are present, the flow advances to step S608 to assign candidate numbers to data, which are left at that time, in turn from data with a larger continuous block length in the lengthwise direction.

If no detected data are present as a result of checking in step S606, the flow advances to step S607 to set "no target region", thus ending the process.

Example of Processing in the Second Stage

First, the effects obtained upon applying chromaticity determination based on continuous blocks will be described below using FIGS. 12 and 16.

Figure 12:
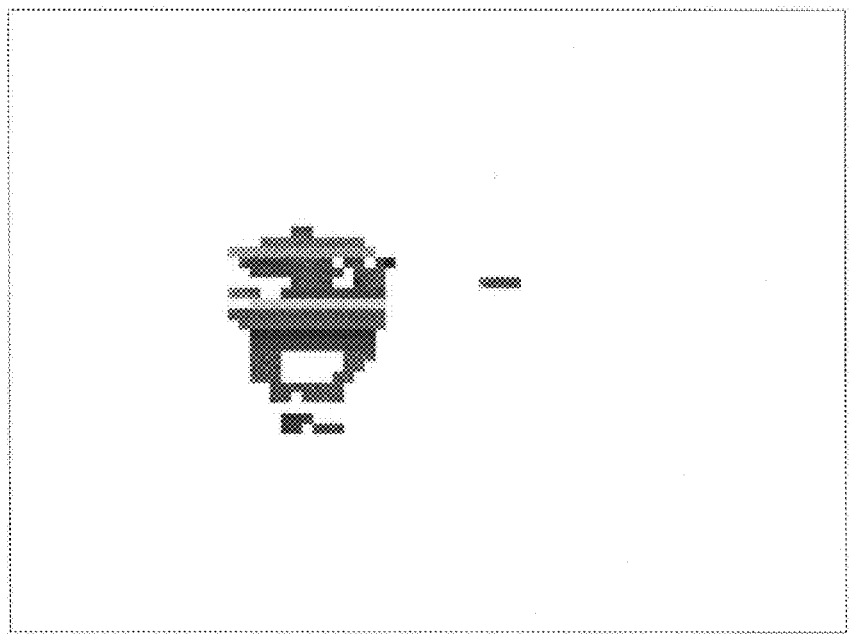
FIG. 12 shows an example of a BMP file as a result of layout and continuous block detection based on the chromaticity detection results for respective 8*8 blocks from the first image sample.

FIG. 12 shows the detection result of the portrait image shown in FIG. 10. In FIG. 12, detected candidates are arranged in turn from higher priority (in turn from a longer detected block length) in the order of color codes (1=brown, 2=red, 3=orange, 4=yellow, 5=green, 6=blue, 7=violet, 8=gray), and other detection results have only chromaticity values that fall within the appropriate range. As can be seen from FIG. 12, irrelevant candidates such as a background and the like can be excluded by continuous block detection compared to chromaticity detection on the pixel level.

Figure 16:
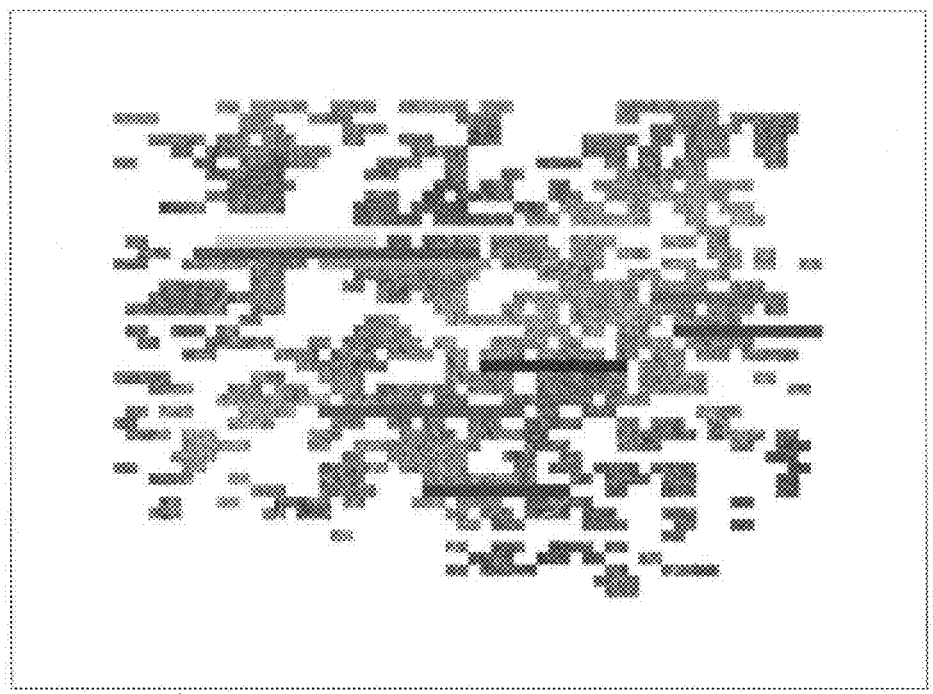
FIG. 16 shows an example of a BMP file as a result of layout and continuous block detection based on the chromaticity detection results for respective 8*8 blocks from the second image sample.

FIG. 16 shows the detection result of the dead tree grove shown in FIG. 14. As can be seen from FIG. 16, even continuous block detection detects images other than an image of interest.

Example of Selecting Area of Interest from Candidate Areas

Example of Determination Table at an Image in VGA Size

Using a plurality of image samples having a VGA (video graphics array) size (640*480 pixels), the frequency characteristics in optimal chromaticity continuous blocks detected from the person flesh and dead tree grove portions are calculated.

Figure 18:
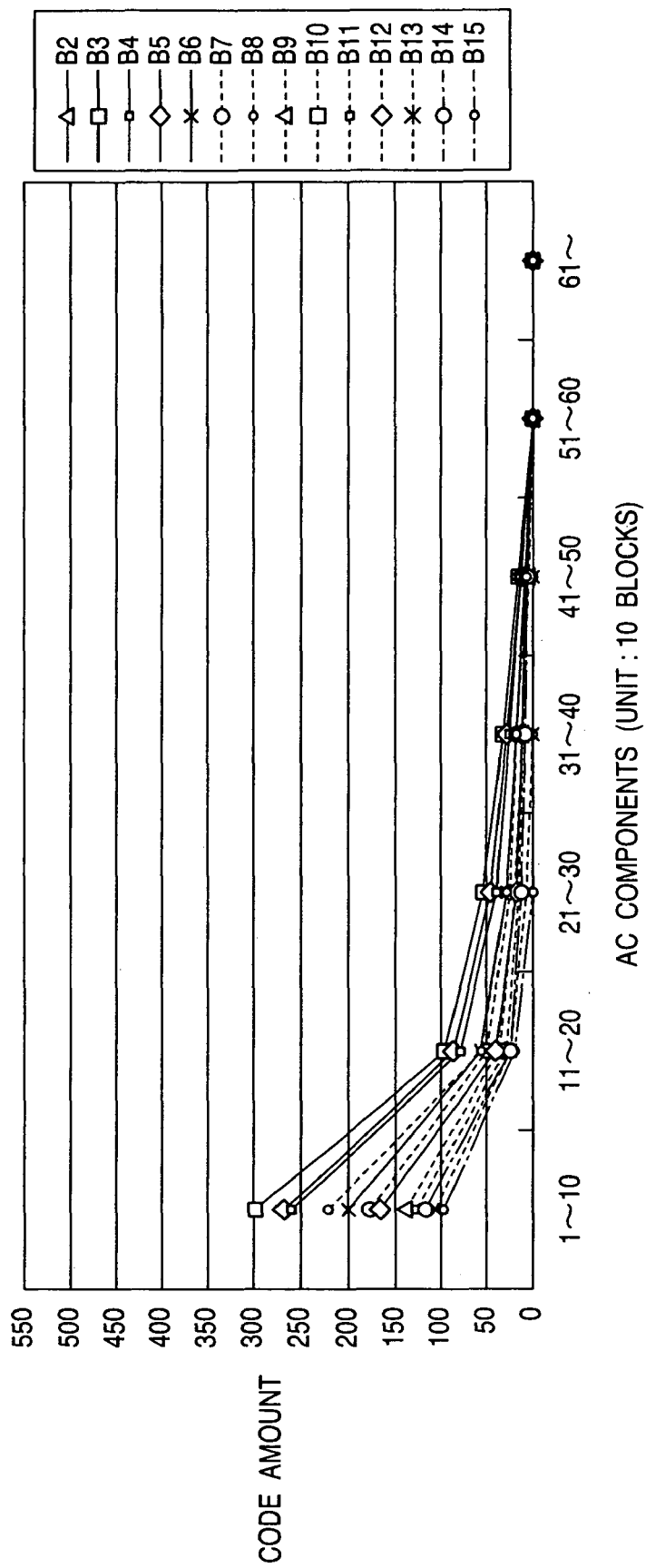
FIG. 18 is a graph showing the frequency characteristics of AC components in continuous chromaticity detection values of person flesh detection data in person flesh detection in the first embodiment.

FIG. 18 shows the quotients obtained by dividing, by the numbers of continuous blocks, the sums of each 10 DCT data of blocks which are detected as continuous blocks from the flesh of a person who appears in an image, and are arranged in ascending order of frequency, i.e., summarizes the average frequency component per block of continuously detected blocks.

Therefore, the abscissa in FIG. 18 groups the frequency components of 63 AC components, and plots data for six groups for respective 10 components, and highest-frequency data for three components. The ordinate plots values obtained by summing up elements of respective frequency components.

As can be seen from FIG. 18, blocks have higher frequency components with increasing values. Also, data are expressed by data lines which are color-coded for respective numbers of continuously detected blocks. For example, "B2" represents the average values of data of two continuously detected blocks, and "B15" represents the average values of data of 15 continuously detected blocks are detected. Likewise, FIG. 18 shows the spatial frequency characteristics for the respective numbers of continuously detected blocks of average person flesh color portions from a plurality of images "B2" to "B15".

The detection results reveal the following facts.

1) After three lowest frequency component groups with larger low frequency component values, the code amount is 50 or less irrespective of the number of continuous blocks.

2) The frequency characteristics become lower with increasing continuous block length.

As can be seen from these results, the frequency characteristics of a person flesh color portion are defined by relatively low frequency components, and a larger number of detected continuous blocks indicates a large photographed size of an object. Frequency components lower upon calculating the average values of the continuous blocks.

By substituting one representative value in continuous blocks depending on the continuous block lengths even when these blocks have the same chromaticity value as an image of interest (for example, in case of blocks "B6", the sum, which is obtained by summing up six detected block values as a group for 10 components in ascending order of frequency, are added for each group, and is divided by 6 as the continuous block length to calculate an average), the spatial frequency characteristic value changes. Hence, as can be seen from the above description, appropriate frequency characteristics vary depending on the number of detected continuous blocks.

Figure 19:
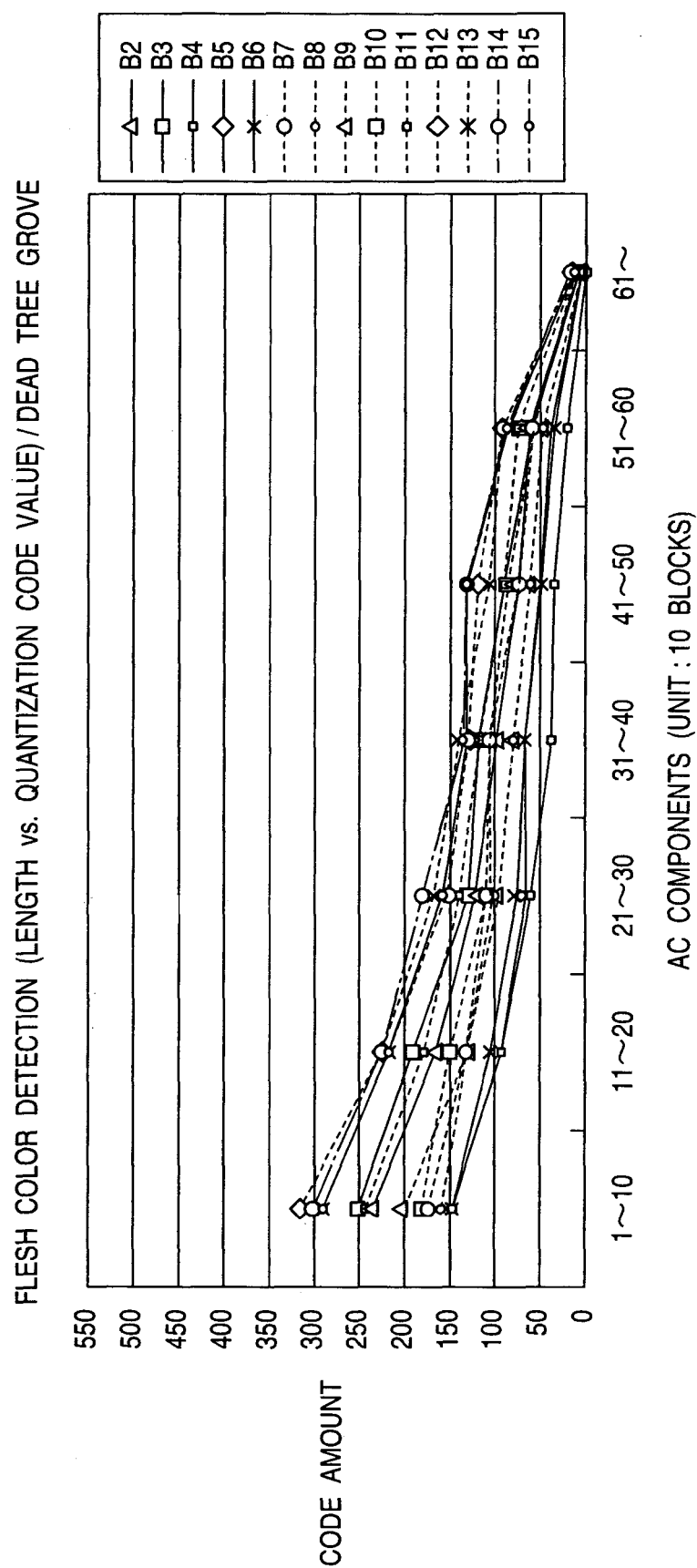
FIG. 19 is a graph showing the frequency characteristics of AC components in continuous chromaticity detection values of detection data of a dead tree grove in person flesh detection in the first embodiment.

FIG. 19 shows the detection results by preparing a plurality of dead tree grove photos having a chromaticity range similar to the person flesh color chromaticity as in FIG. 18.

The detection results reveal the following facts.

1) Many higher frequency component data are present compared to the spatial frequency characteristics of a person flesh; and 2) The lowest frequency component group is not largely different from the person flesh result.

As can be seen from these results, by detecting frequency components in continuous blocks, detected objects having the same chromaticity value can be distributed depending on their frequency characteristics.

FIG. 4 shows the spatial frequency characteristics of a person flesh as an image of interest, which is used in this embodiment. The uppermost column in FIG. 4 shows appropriate ranges of the frequency characteristics for a VGA (640*480) image.

The continuous block lengths are classified into three groups, i.e., a group of two to eight continuous blocks (~L8), a group of nine to 20 continuous blocks (L9~20), and a group of 21 or more continuous blocks (L21~), and appropriate frequency ranges are set for respective groups. As the appropriate frequency ranges, the frequency characteristics of seven groups for respective 10 components described above are used. Such grouping is made in consideration of the balance between simple processes and high detection precision, but the present invention is not limited to this.

Example of Selecting Determination Tables at Images in VGA Size or UXGA Size A UXGA (1600*1200) image having an image size which corresponds to two million pixels, and is prevalent in digital cameras will be compared with a VGA image under the same photographing condition.

Figure 25:
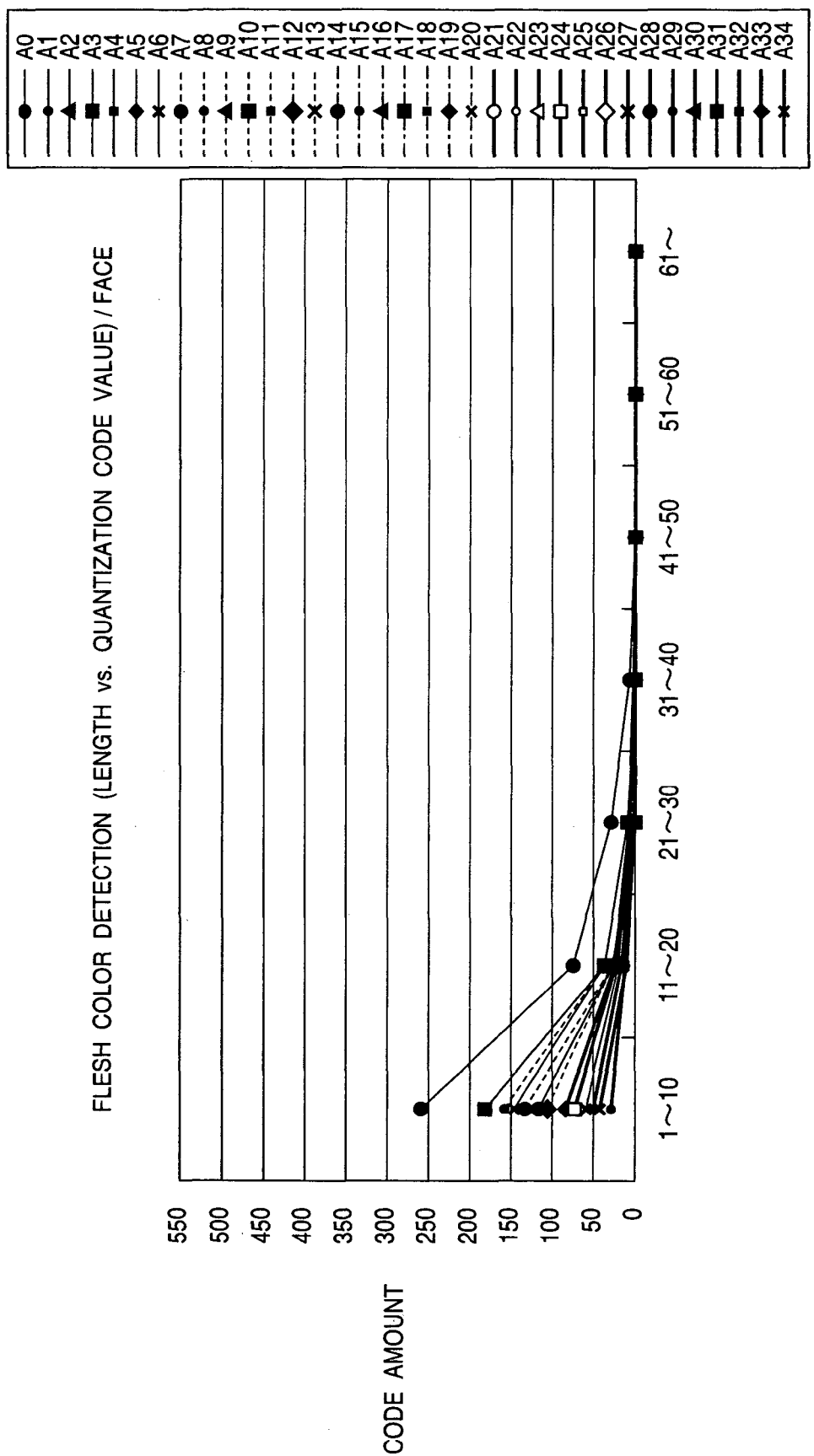
FIG. 25 is a graph showing the frequency characteristics of AC components in continuous chromaticity detection values of person flesh detection data of a UXGA (1600*1200) image in person flesh detection in the first embodiment.

FIG. 25 shows the detection results of a UXGA size image obtained by photographing the same scene as that of data used in FIG. 18, which results are expressed by the frequency characteristics and the averages of the numbers of data in respective ranges as in FIG. 18.

The difference in detection characteristics from the VGA image reveal the following facts.

1) The detection range of continuously detected blocks broadens. More specifically, the number of continuously detected blocks from the VGA image ranges from 2 to 15. By contrast, the number of continuously detected blocks from the UXGA image ranges from 4 to 40.

2) The UXGA image has lower frequency characteristics in blocks. For example, upon examining the averages of blocks of the 1st to 10th components, data are distributed with the range from 300 to 100 in the VGA image, while data are distributed within the range from 200 to 300 in the UXGA image. The size of an image region which can serve as an image of interest within a single image normally falls within a specific ratio range with respect to the entire image.

That is, an image area intended to be extracted must be an image area enable to be used for correcting the whole image. Therefore, even if an image area can be extracted, it is not suitable with considering the correction in the other image areas to correct the whole image based on a feature in the extracted image are when the extracted image area, e.g. face, is too small. For example, it is not suitable to correct the image when a ratio of the extracted image area and the whole image is smaller than about 1/10.

For example, a case will be examined below wherein an image of interest in the entire image occupies only 1/100 in the lengthwise direction. In consideration of a general print, even when appropriate correction is applied to such image of interest, the output image of interest that has undergone correction occupies only a small portion of the print. Hence, it is effective for that image to correct the entire image rather than to correct the specific image of interest, and such image of interest deviates from the definition of "interest".

This embodiment has an appropriate range of an image of interest suited to each image size. An image region which is not less or not more than this range is excluded from a detection candidate of an image of interest to be corrected.

Therefore, in this example, 1/100 in the lengthwise direction in the UXGA image is 1600/100=16 pixels, i.e., 2 blocks (8*8). Hence, even when the chromaticity and frequency components match, such image region is excluded from a candidate in terms of a length. In this connection, in the UXGA image, 4 to 62 blocks are set as a continuous detection range.

In the VGA image, 1/100 is 6.4 pixels according to the same idea, and is smaller than 1 block. In the VGA image, 2 to 25 blocks are set as a continuous detection range. This difference is caused by that of an occupation ratio of one block (8*8) to the entire image depending on the image size.

If an image of interest falls within a given ratio range in the entire image, 8*8 pixel blocks have different meanings in the spatial frequency depending on the image sizes. For this reason, even identically photographed images have different numbers of detected blocks and different frequency characteristics depending on their image sizes.

In this embodiment, the continuous detection range is set for each image, as described above, but may be expressed using a mathematical formula. For example, the minimum number of continuous blocks may be set by:

$$\frac{\text{input image longitudinal direction(pixels)}}{8 \text{(pixels)}} * \frac{5 \text{(mm)}}{\text{output longitudinal direction}} \quad (5)$$

Figure 26:
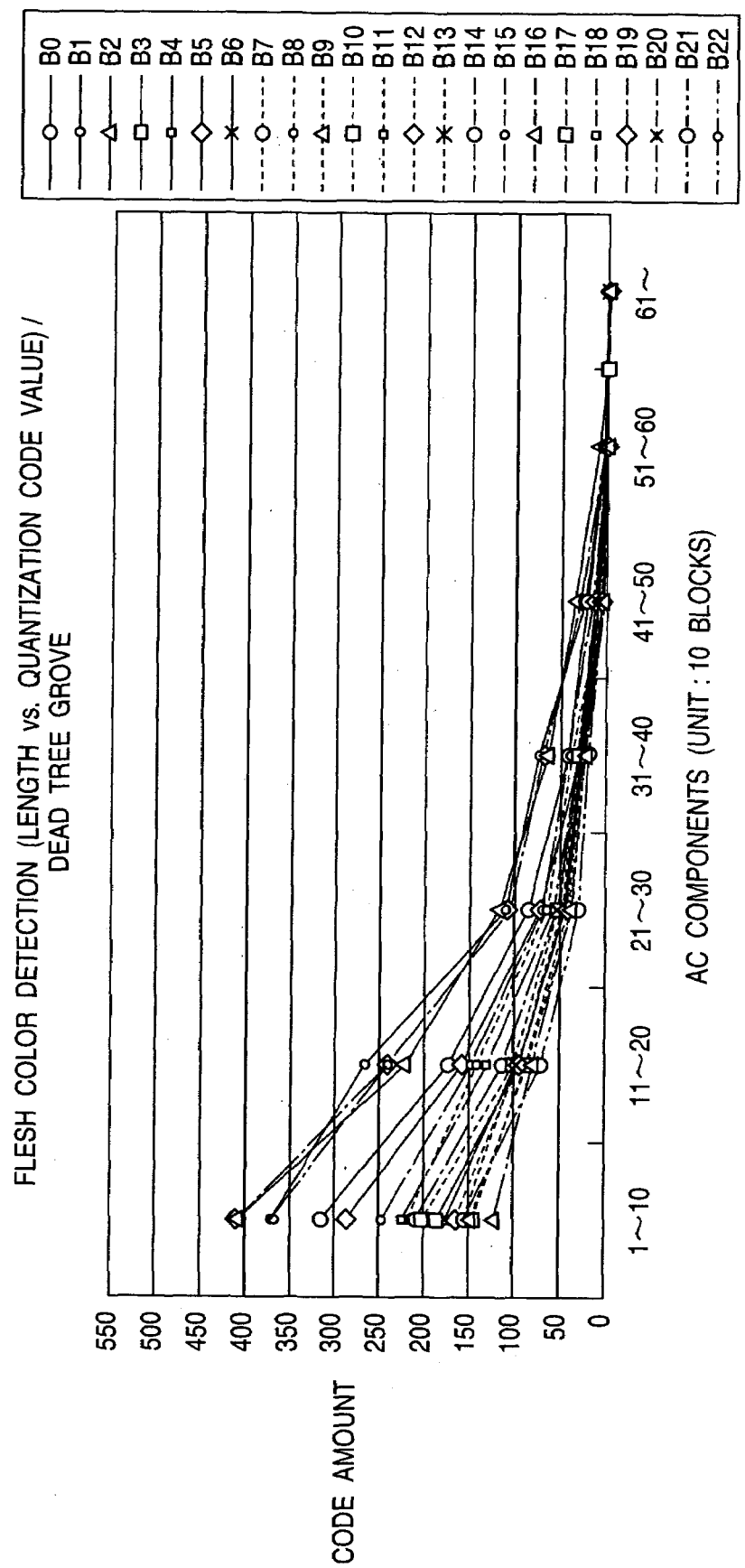
FIG. 26 is a graph showing the frequency characteristics of AC components in continuous chromaticity detection values of detection data of a dead tree grove of a UXGA (1600*1200) image in person flesh detection in the first embodiment.

FIG. 26 will be examined below. FIG. 26 shows a photo of a dead tree grove which has a chromaticity range similar to that of flesh color chromaticity of a person. FIG. 19 shows data of the VGA image, but FIG. 26 shows data of the UXGA image.

Upon comparison with FIG. 19, there is the same tendency as in comparison between FIGS. 18 and 25. As can be seen from FIG. 26, high frequency components are considerably reduced in groups of 20th or higher AC components.

However, since the data shown in FIG. 26 form a distribution extremely different from those of the person flesh, they can be separated by setting application ranges for respective frequency bands.

A UXGA image determination table shown in FIG. 27 is set for this purpose. The configuration of this table is substantially the same as the VGA image determination table in FIG. 4, except for different spatial frequency characteristics of average blocks due to an image size difference.

Example of Sharing Determination Table at VGA and UXGA Images

Figure 43:
FIG. 43 shows an image sample which is photographed to have a UXGA (1600*1200) size and includes a person object in the first embodiment.
Figure 45:
FIG. 45 shows an image sample which is photographed to have a VGA (640*480) size and includes a person object in the first embodiment.

FIG. 43 shows an image sample obtained by taking a picture of a person to have a UXGA (1600*1200) size. FIG. 45 shows an image sample obtained by taking a picture of the face of the same person to have a VGA (640*480) size.

Figure 44:
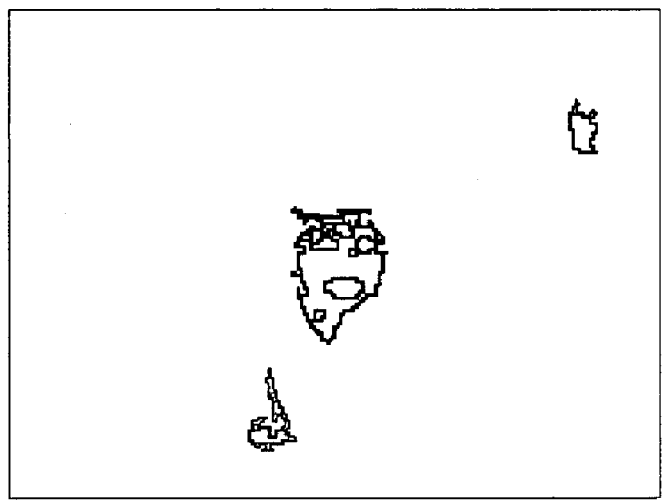
FIG. 44 shows a region detected by person flesh region detection of the image sample shown in FIG. 43.
Figure 46:
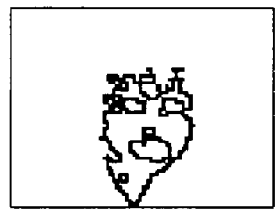
FIG. 46 shows a region detected by person flesh region detection of the image sample shown in FIG. 45.

When these two image samples undergo person flesh region detection in primary extraction using the definition of the above embodiment, the results of detected regions are as shown in FIGS. 44 and 46.

Paying attention to the face of the person, the number of detected blocks in the detected region is 719 in the UXGA image (FIG. 44) and is roughly the same (639) in the VGA image (FIG. 46). Also, feature amounts based on the average values of AC components of DCT at that time also become roughly the same as follows.

Average Values of AC Components of DCT

|  | 1-10 | 11-20 | 21-30 | 31-40 | 41-50 | 51-60 | 61-63 |
| --- | --- | --- | --- | --- | --- | --- | --- |
| UXGA | 105 | 26 | 8 | 2 | 0 | 0 | 0 |
| VGA | 109 | 28 | 15 | 9 | 5 | 2 | 0 |

That is, the feature amounts based on the average values of AC components of DCT in the person flesh detection region depend on the number of pixels (the number of 8*8 blocks) which form the detected region rather than the input image size.

Figure 36:
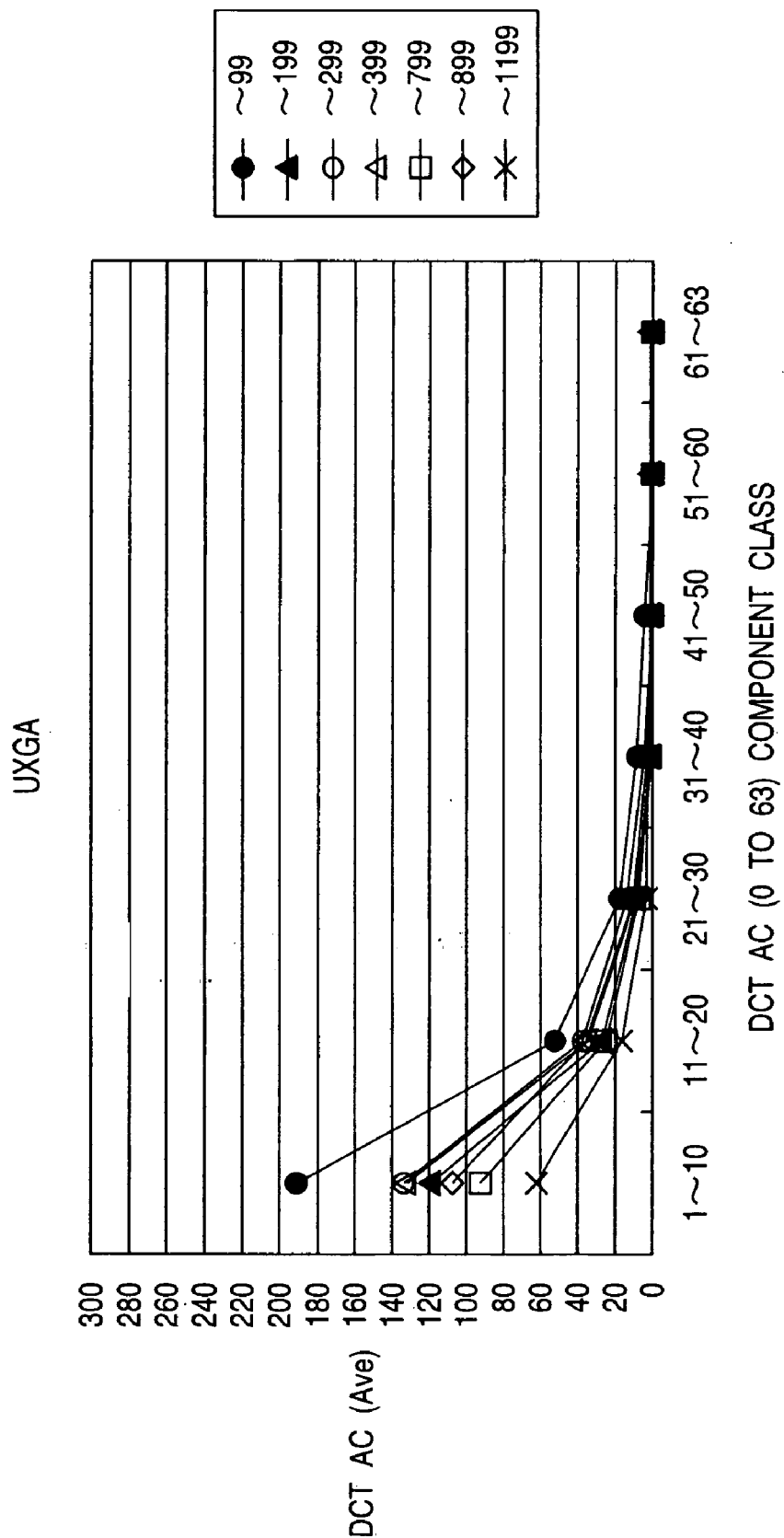
FIG. 36 is a graph obtained when a person flesh region present in an image file with a UXGA (1600*1200 pixels) size is detected, and the average values of AC components of DCT in 8*8 blocks in JPEG compression in that person flesh region are classified using the number of detected pixels (the number of 8*8 blocks in JPEG compression) in the first embodiment.

FIGS. 36 (UXGA) and 37 (VGA) summarize the relationship between the number of 8*8 blocks detected from a plurality of UXGA and VGA images, and the average values of AC components of DCT, on the basis of the above fact.

Figure 37:
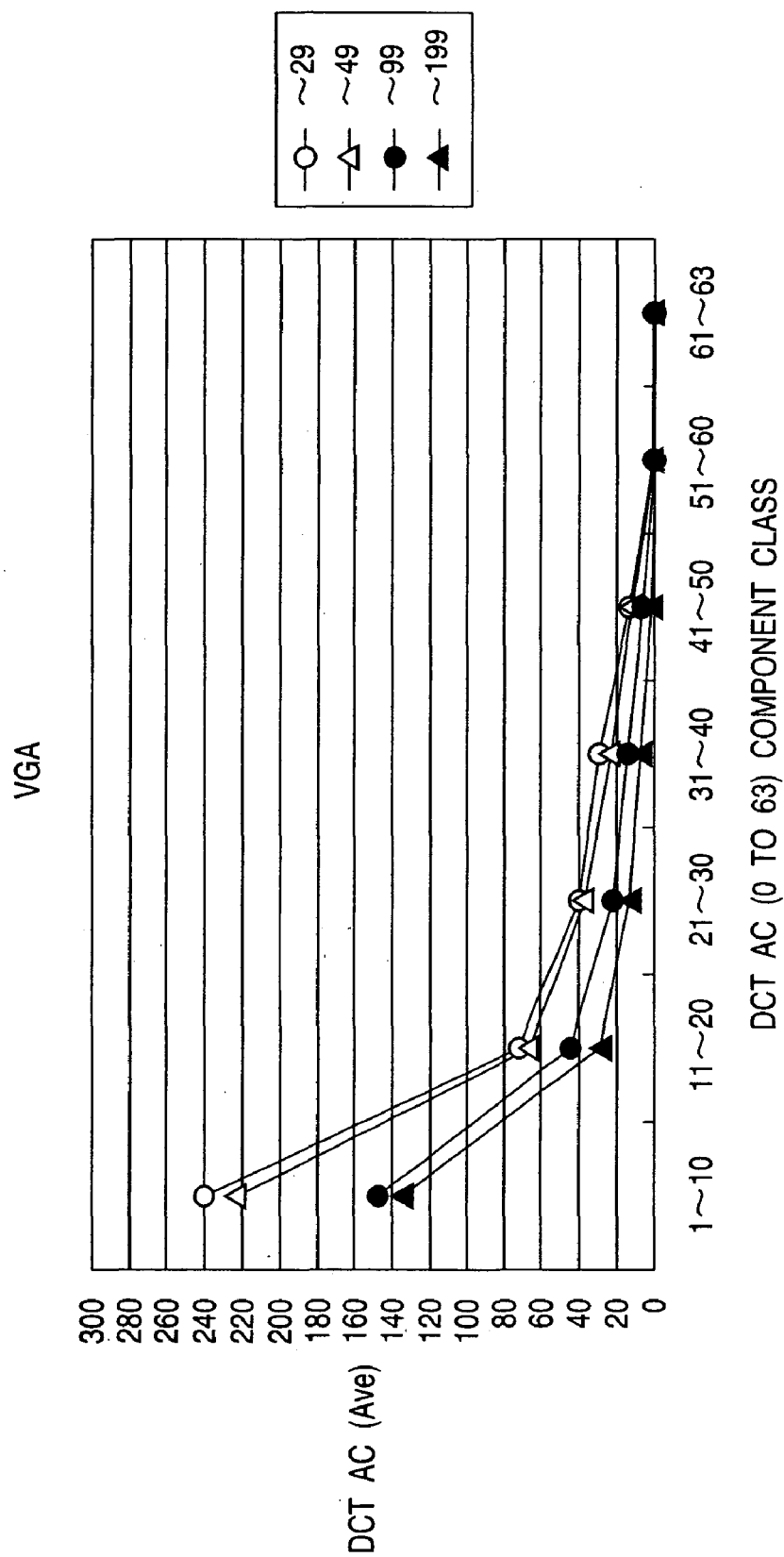
FIG. 37 is a graph obtained when a person flesh region present in an image file with a VGA (640*480 pixels) size is detected, and the average values of AC components of DCT in 8*8 blocks in JPEG compression in that person flesh region are classified using the number of detected pixels (the number of 8*8 blocks in JPEG compression) in the first embodiment.

The abscissa of each of FIGS. 36 and 37 plots groups of each 10 average values of AC components of DCT values in turn from lower spatial frequency components. The ordinate plots the code amount of DCT (the sum of 10 values; the sum of three components in the seventh group).

Even identical images have different numbers of detected 8*8 blocks due to different numbers of pixels, even when the occupation ratio of the person flesh region with respect to the entire image remains the same. Hence, in FIGS. 36 and 38, the numbers of detected blocks assume different values in some portions. However, upon comparing common data 100 to 199 in FIGS. 36 and 37, it can be confirmed that they have approximately the same characteristics.

FIG. 47 specifies the number of 8*8 blocks as the detected image size and the feature amounts of average values of AC components of DCT values of the detected region on the basis of the aforementioned result.

In the above embodiment, feature amount determination tables depending on image sizes must be prepared. However, using this method, the determination table can be simplified.

Figure 49:
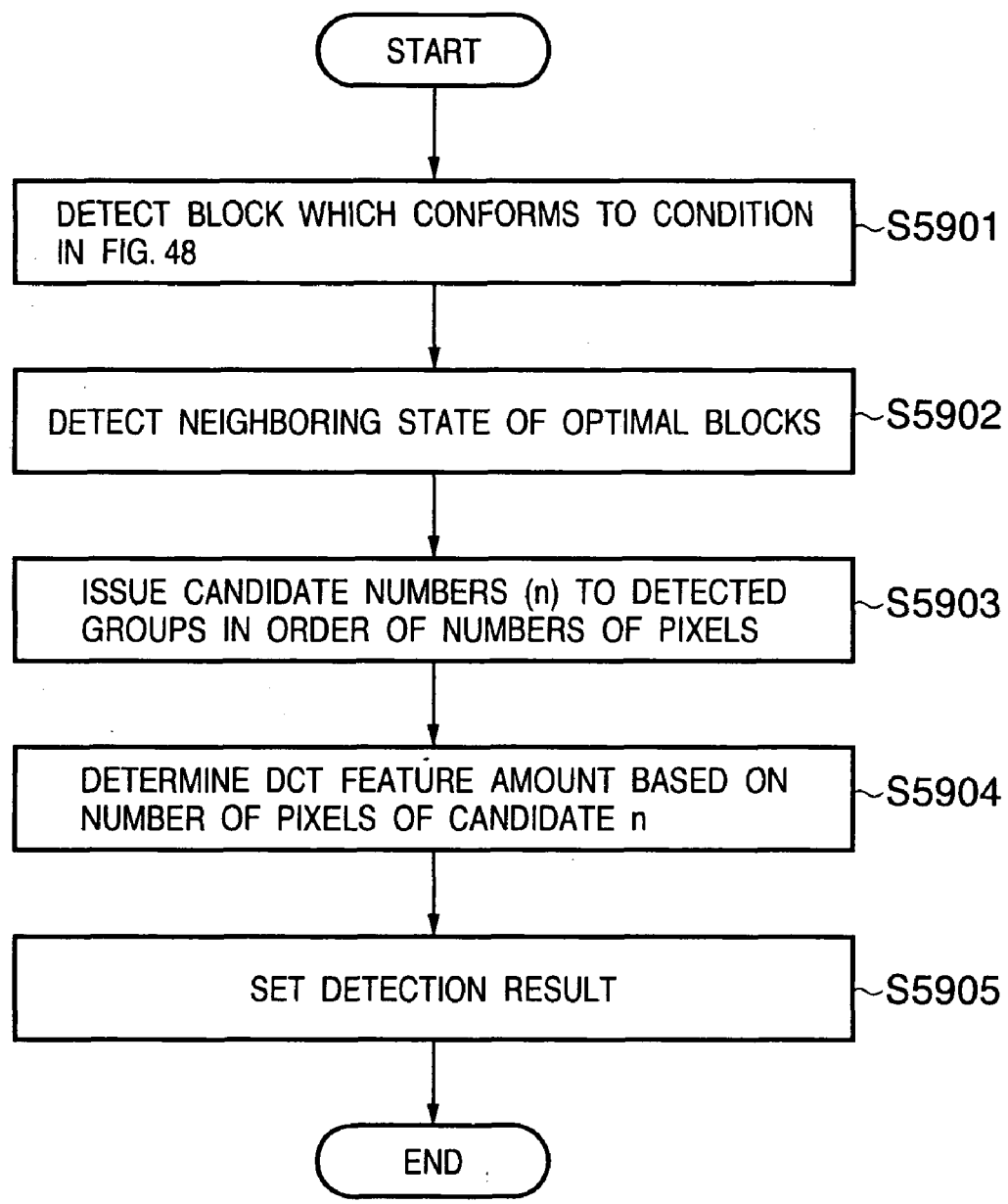
FIG. 49 is a flow chart showing the processing sequence of a DCT feature amount determination method based on the number of pixels (number of blocks) an extraction region depending on the chromaticity ratio.

FIG. 49 is a flow chart of primary extraction using this embodiment.

In step S5901, blocks with the optimal chromaticity ratio specified in FIG. 48 in the first stage are detected.

In step S5902, neighboring states of optimal blocks in the above step are detected to form groups.

In step S5903, candidate numbers are issued to candidate groups in descending order of the number of blocks which form each group.

In step S5904, determination based on the feature amounts of AC components of DCT is executed in the order of candidate numbers.

In step S5905, necessary information is set so that the finally detected result which conforms to determination is passed to image correction.

Example of Flow Selecting an Image Area of Interest

The description will revert to FIG. 6. As described above, candidate numbers 1 to n (n=8 in this embodiment) of images of interest are assigned to data in descending order of continuous block length in the lengthwise direction, which are detected based on chromaticity (step S608). No candidate number can be assigned to data detected after n.

The flow then advances to step S609 to sequentially compare if each of candidates 1 to n conforms to the range of the spatial frequency characteristic appropriate range determination table corresponding to the numbers of continuous blocks shown in FIG. 4. As a result, if no optimal candidate is found, it is determined that no image of interest is present.

If the image size is VGA (640*480), it is compared if each of candidates 1 to n conforms to the range of the spatial frequency characteristic appropriate range determination table corresponding to the numbers of continuous blocks shown in FIG. 4. It is compared if the feature amount of the frequency characteristics of the first continuously detected blocks falls within an optimal range. At this time, in case of an image having a different input image size, e.g., a UXGA (1600*1200) image, it is preferable that comparison and determination are made using the UXGA table shown in FIG. 27 in conformity determination, as described above.

In this embodiment, comparison and determination of the frequency characteristics are made using an adaptive frequency characteristic determination table set for each image size or image size range (a table common to a specific image size range such as VGA to XGA, SXGA to QXGA, and the like). However, a criterion using a mathematical formula may be prepared instead.

For example, as a method of generating a mathematical formula, based on existing VGA and UXGA determination tables, correspondence of changes in distance between two points depending on image sizes and frequency component values is determined, and is approximated by a linear equation when it is used.

(Example of Determining an Image Area of Interest and a Correction Strength)

As a result of determination using spatial frequency, if no optimal candidate is found, it is determined that no image of interest is present (not shown in FIG. 6). If optimal candidates are found, a process is advanced to step S613 to create a group of candidates and determine a correction strength by selecting one of the group as an image area of interest.

Figure 22:
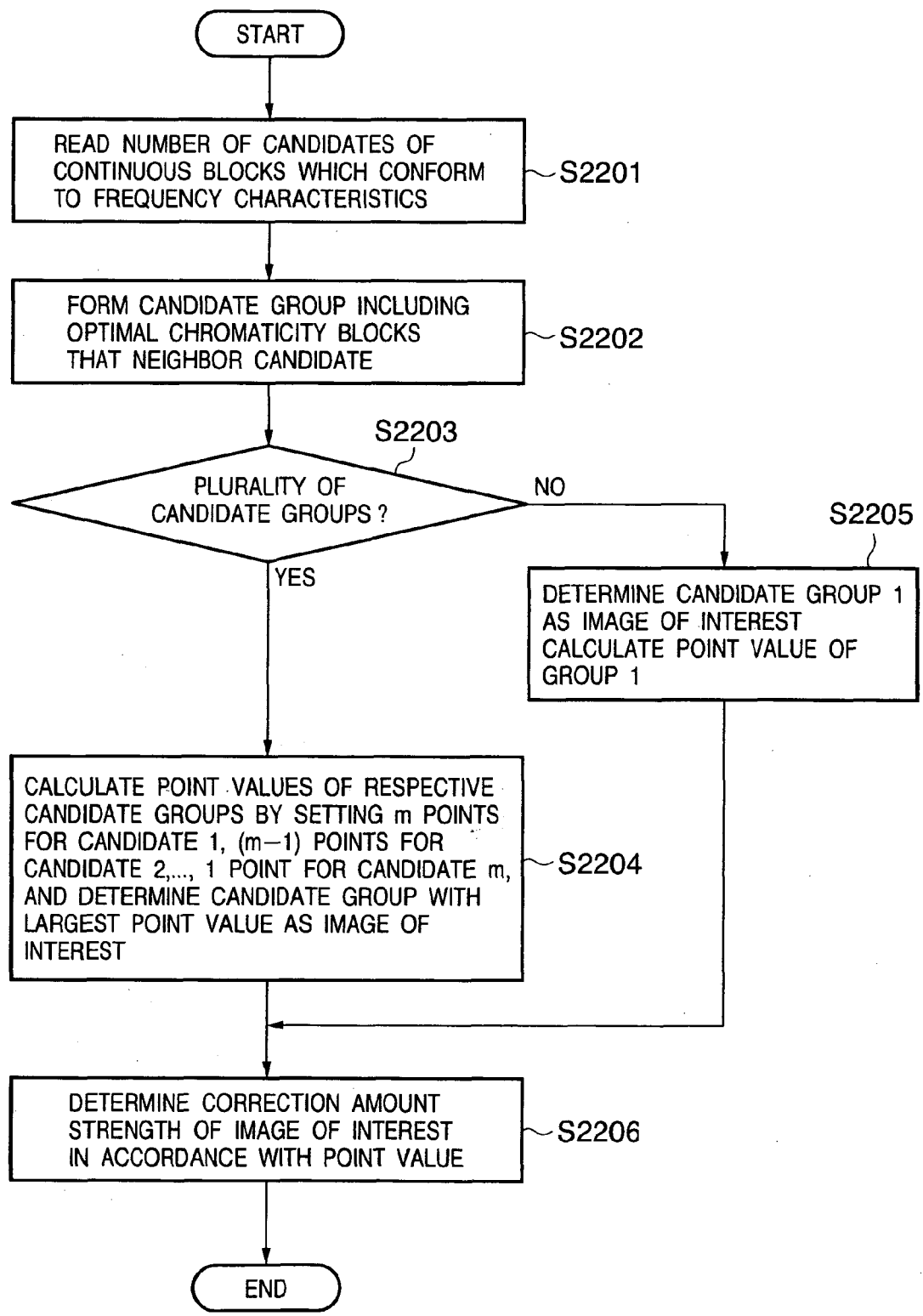
FIG. 22 is a flow chart showing the determination sequence of a candidate group in the first embodiment.

FIG. 22 is a flow chart of that process.

In step S2201, the number of candidates is confirmed (1 to m).

The flow advances to step S2202 to form a candidate group. In this case, optimal chromaticity blocks which neighbor each candidate form a candidate group. When a candidate group includes a plurality of candidates, the candidate group is assigned, as a group number, the smallest number assigned to the candidates in the group.

The flow advances to step S2203 to check if there are a plurality of candidate groups. If it is determined as a result of checking that there is only a candidate group, the candidate group is determined as an image area of interest and a point of the candidate group is calculated as mentioned below in step S2205.

If there are a plurality of the candidate groups, in step S2204, it is finally determined which group is should be select as an image area of interest used to correct the image by comparing between points of the plurality of the candidate groups and selecting a candidate group having the highest point. If a plurality of the candidate groups have the same point, a candidate group having the smallest number as a group number is finally selected as an image area of interest.

As a point assignment method, if there are "m" candidates, a point "m" is assigned to candidate 1, a point "m−1" is assigned to candidate 2, . . . , a point "1" is assigned to candidate m.

FIG. 23 shows a practical example of the superiority determination result between candidate groups. Two candidate groups are detected, and since the point of the right candidate group is higher than that of the left candidate group, the right candidate group is set as a final candidate.

Since the absolute value of the point value represents the reliability of an objective candidate group as an image of interest, a correction strength for an image of interest is set in accordance with this point value. As a method of determining the correction strength, a threshold value is set using the points, and the strength is designated based on the comparison result with the threshold value.

In place of detection of an image of interest using the points, a group which includes a candidate with the largest detection value or the detection value itself may be selected as an image of interest as a lighter process. In this case, although the detection probability slightly varies in this embodiment, this method is often suited to a device with lower processing performance.

Example of Processing Result of the Embodiment

Figure 13:
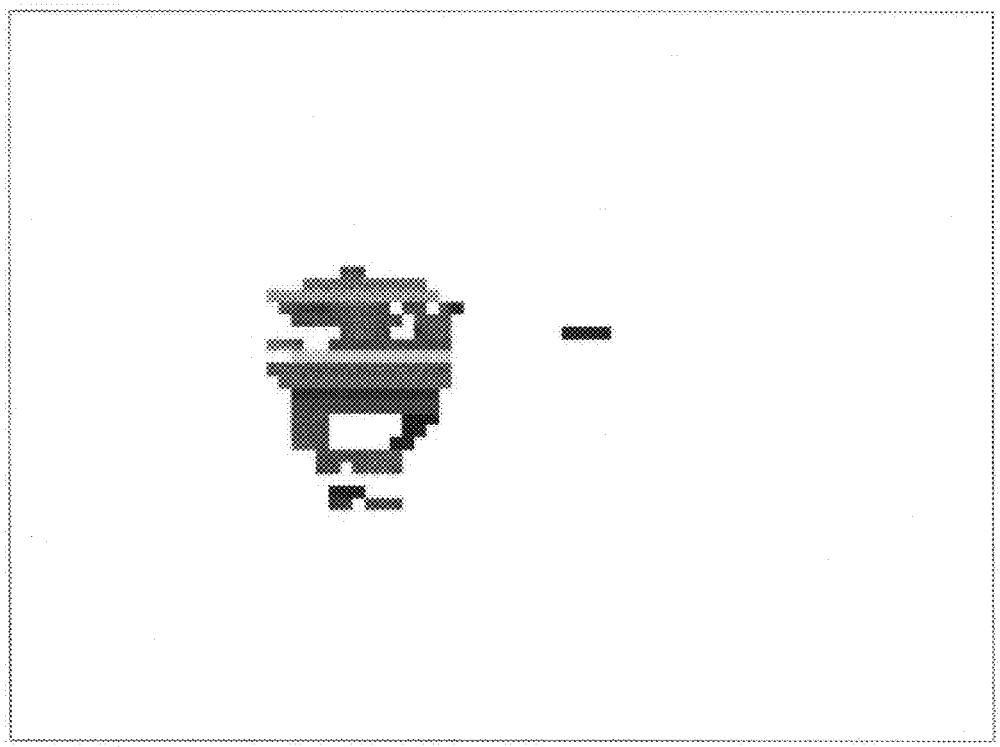
FIG. 13 shows an example of a BMP file as a result of detection by means of layout, continuous blocks, and AC components on the basis of the chromaticity detection results for respective 8*8 blocks from the first image sample by image of interest detection in the first embodiment.
Figure 17:
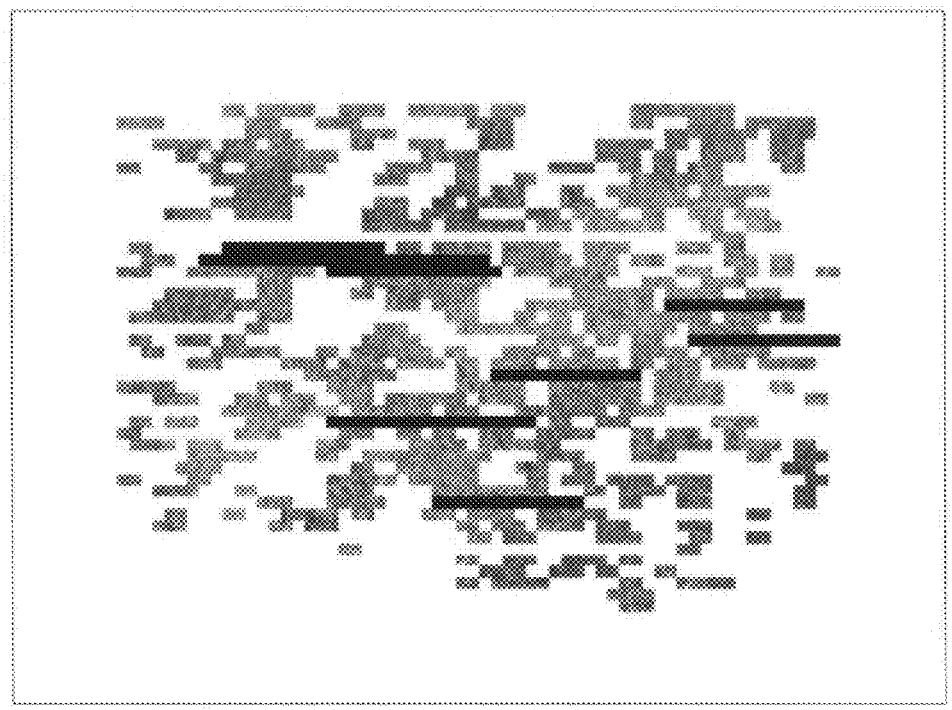
FIG. 17 shows an example of a BMP file as a result of detection by means of layout, continuous blocks, and AC components on the basis of the chromaticity detection results for respective 8*8 blocks from the second image sample by image of interest detection in the first embodiment.

FIGS. 13 and 17 show the results for FIGS. 10 and 14 above.

In FIG. 13, the flesh of the face of a person as an image of interest is detected. In FIG. 17, respective candidates do not conform to the frequency characteristics, and are displayed in black. This indicates a state wherein no image of interest is detected, and means that this image is not subjected to image correction that places an importance on an image of interest.

In this way, an image of interest can be detected. Since normal image correction is made in consideration of the balance of the entire image, the image quality of an image of interest often impairs due to backlight or the like. However, according to image of interest detection of this embodiment, exposure correction required to optimize the luminance level, and color balance correction and saturation correction required to obtain a preferred flesh color can be made on the basis of the data of the image of interest, thereby obtaining an image with higher quality.

FIG. 24 shows an example of a normal image correction result and an image correction result that exploits the image of interest detection of this embodiment. As shown in FIG. 24, when image correction is made by exploiting the image of interest detection of this embodiment, an image of interest such as a person or the like can be printed with higher quality.

Improved Example 1 of Processing Flow in the First Image Extraction

The characteristics of an image due to a quantization table in the decoding section will be explained below.

FIGS. 28 to 30 show 13 different quantization tables used to determine an image compression ratio when a representative image application creates a JPEG file. In FIGS. 28 to 30, table "00" is used to set the highest image compression ratio, and table "12" is used to assure the highest saved image quality and to set the lowest compression ratio.

The quantization tables will be described below. Each table is used to further compress data after DCT of an 8*8 image that has been explained in 3. DCT and 4. QUANTIZATION TABLE in FIG. 3, and to quantize values corresponding to 64 spatial frequencies in an image using values at the same positions in the table.

When DCT in FIG. 3 is quantized using table "00", an upper left value "224" in an 8*8 block is quantized by an upper left value "32" at the same position in table "00" to yield "7". On the other hand, at the lower right position of the 8*8 block, which corresponds to the highest frequency component, "−1" is quantized by "12" to yield "0".

Figure 31:
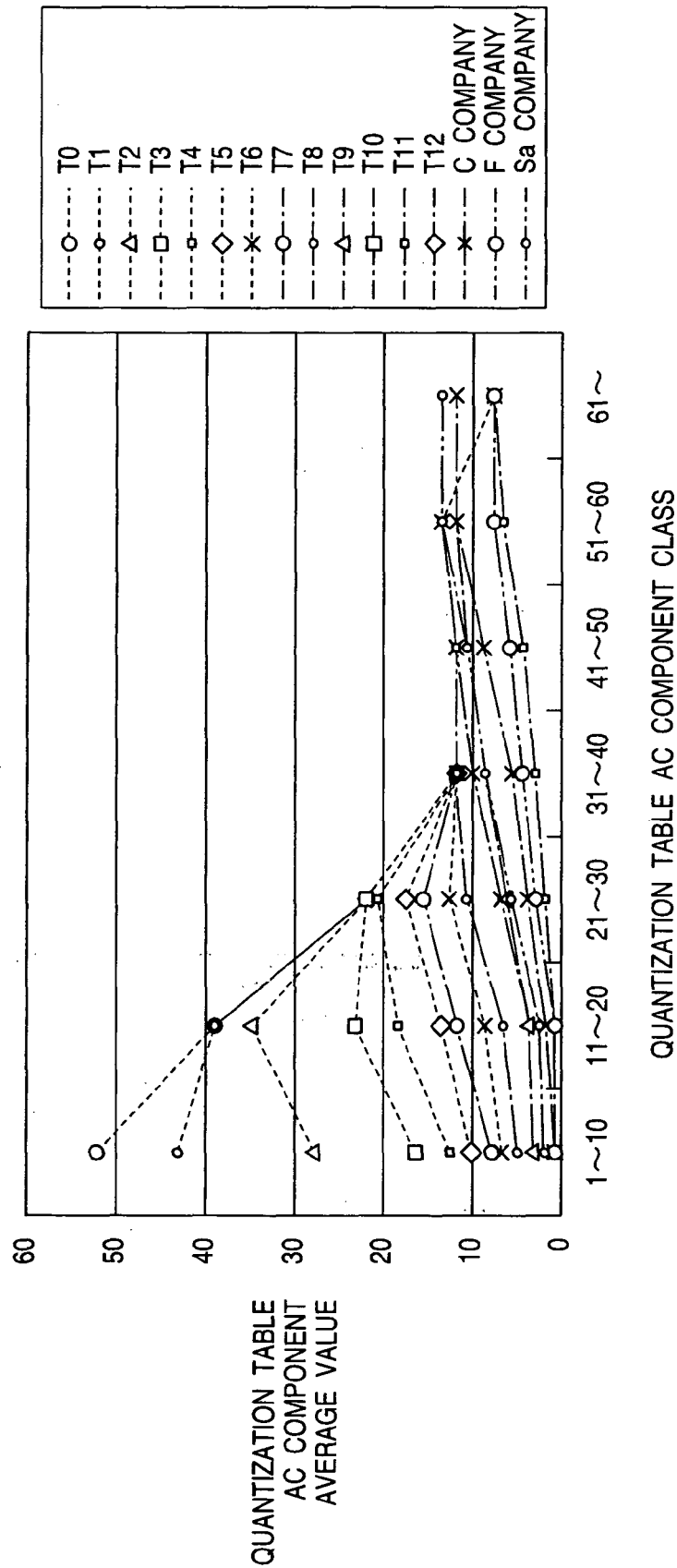
FIG. 31 is a graph showing the relationship between the compression ratio and frequency characteristics in the quantization table.

FIG. 31 shows the characteristics of tables "00" to "12" in FIGS. 28, 29, and 30, and those of quantization tables used in storage units of commercially available digital still cameras.

The abscissa groups 10 each components of 64 AC components in each quantization table, and the ordinate plots the average value of the values for respective 10 components. Therefore, FIG. 31 allows to confirm spatial frequency components which are quantized in larger quantity.

In tables "00" to "04", the quantization ratio of lower frequency components is high. In commercially available digital still cameras, the quantization amount of lower frequency components is small, and that even in a higher-frequency component range is less than "15". A quantization ratio corresponding to such quantization amount is table "10" or higher in the application, and is ranked as a low compression ratio as image quantization.

Figure 32:
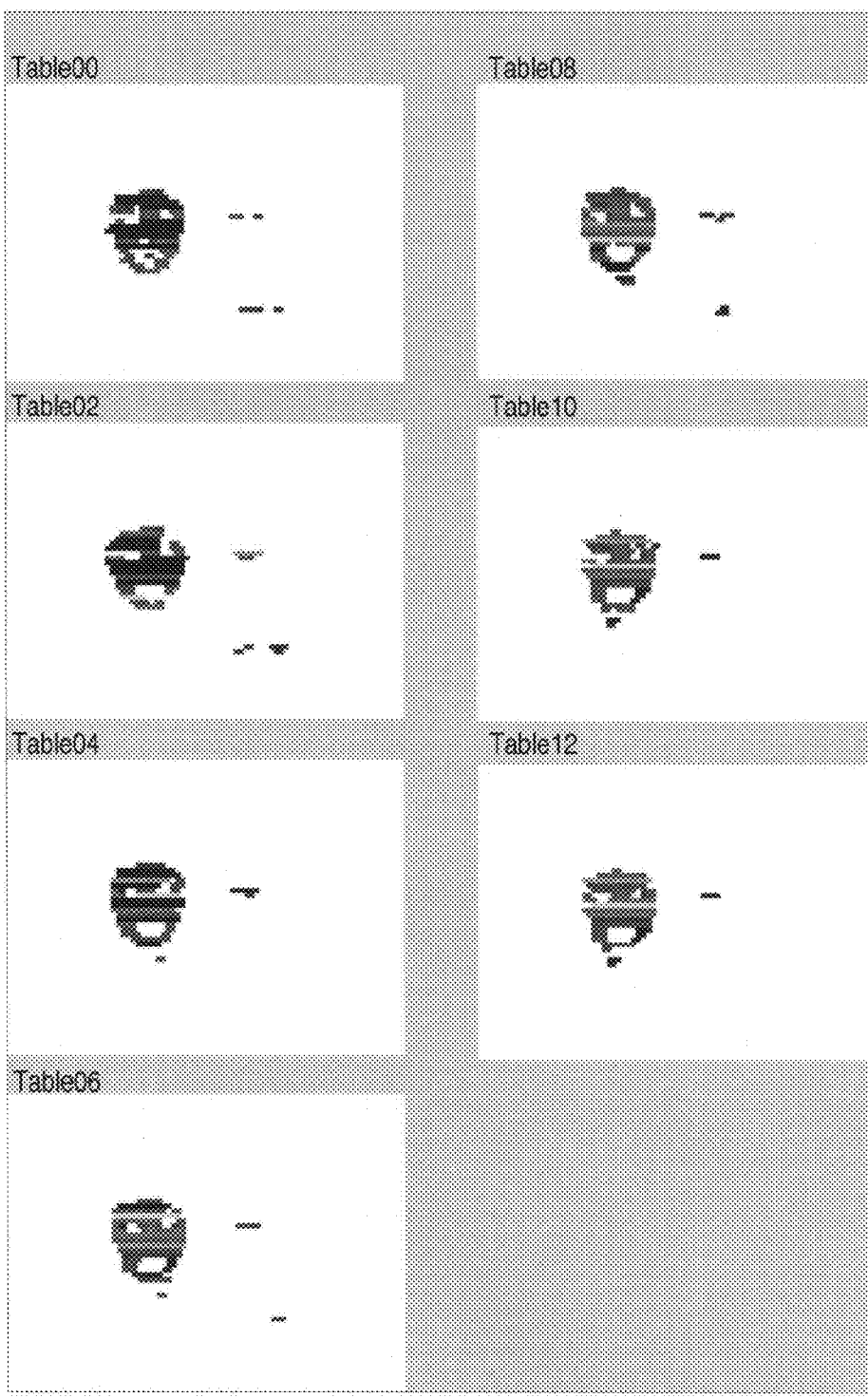
FIG. 32 shows an example of the results of image of interest detection.
Figure 33:
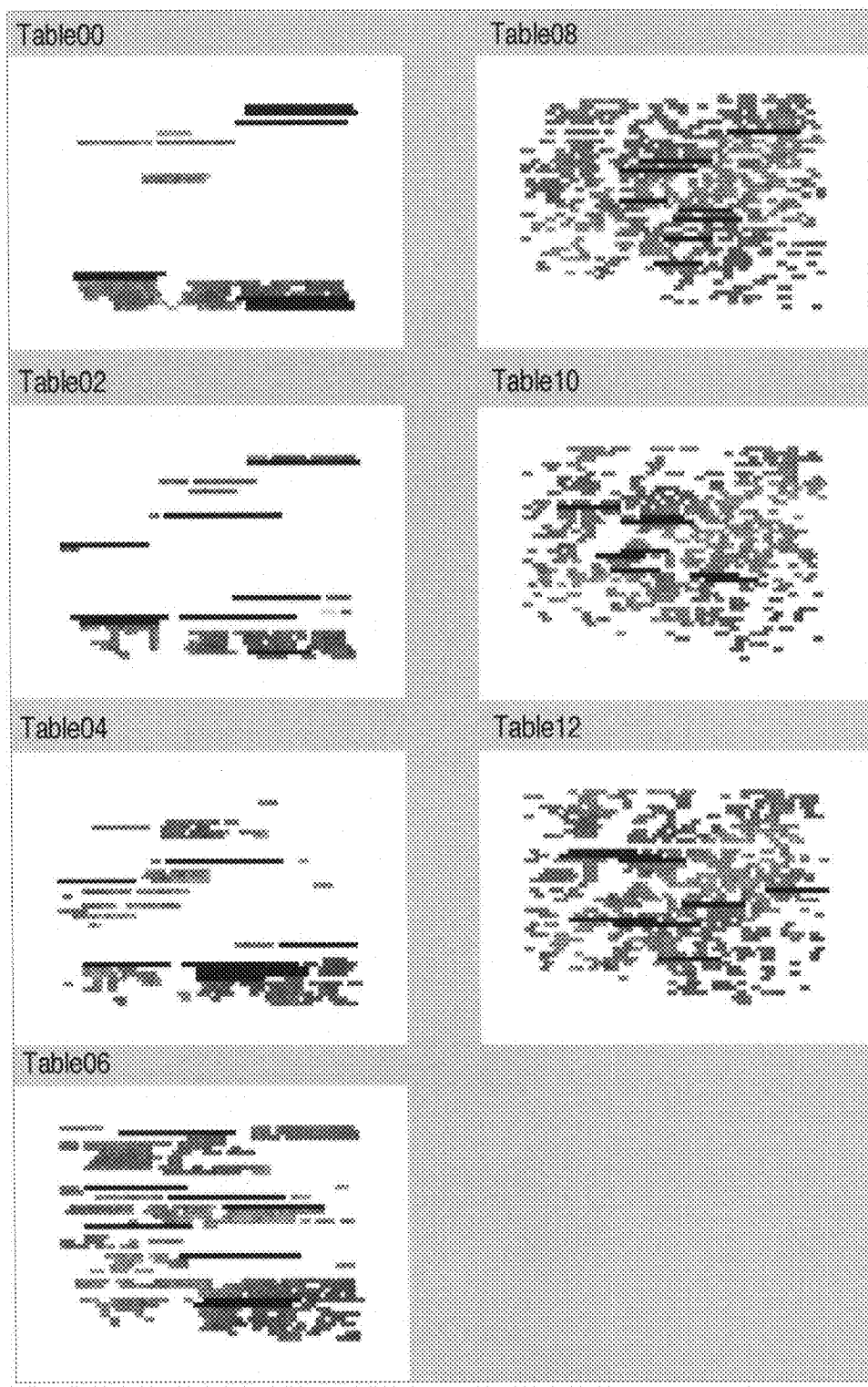
FIG. 33 shows an example of the results of image of interest detection.

FIGS. 32 and 33 show the image of interest detection results from images obtained by quantizing, using every other tables, FIG. 10 that shows a portrait image and FIG. 14 that shows a dead tree grove which matches person flesh chromaticity.

In case of FIG. 32, when table "00" is used, the result deviates from the person characteristics defined by the determination table (FIG. 4) due to the quantization size of lower frequency components. In table "02", a person can be detected but the detection point is low. Using table "06" or higher, stable detection is allowed.

In case of FIG. 33, when table "00" is used, detected values which normally fall within a frequency range higher than the person flesh determination table (FIG. 4) and deviate from the person characteristics are determined as "detected data" due to quantization errors, resulting in determination errors. In this case as well, stable detection is allowed using table "08" or higher.

Therefore, since the determination precision varies depending on quantization table values, quantization table determination is made for this purpose. That is, since a feature in an image is extracted using AC components of DCT coefficients in the compressed image as characteristic value, when a value of the quantization table is too large, AC component are inclined to be lose and thereby the determination of an image area on interest can be error. Therefore, in order to detect correctly an image area of interest in an image which is a high quality image such as JPEG image data of an digital camera or Adobe Photo-shop, it is generally known that a sum of values in the quantization table should not be beyond "630".

In this embodiment, for the sake of simple determination, respective items of a quantization tables are added, and only when the sum total is equal to or smaller than "630", a compatible image which can be used in determination is determined.

In addition to this quantization table determination methods, some methods such as a method of paying attention to values corresponding to low frequency components or the like, a method of limiting the sum total up to a component "30" in a lower frequency range to "150", and the like are available depending on the spatial frequency characteristics of an image of interest to be detected. Also, the characteristics of a quantization table may be used.

Figure 34:
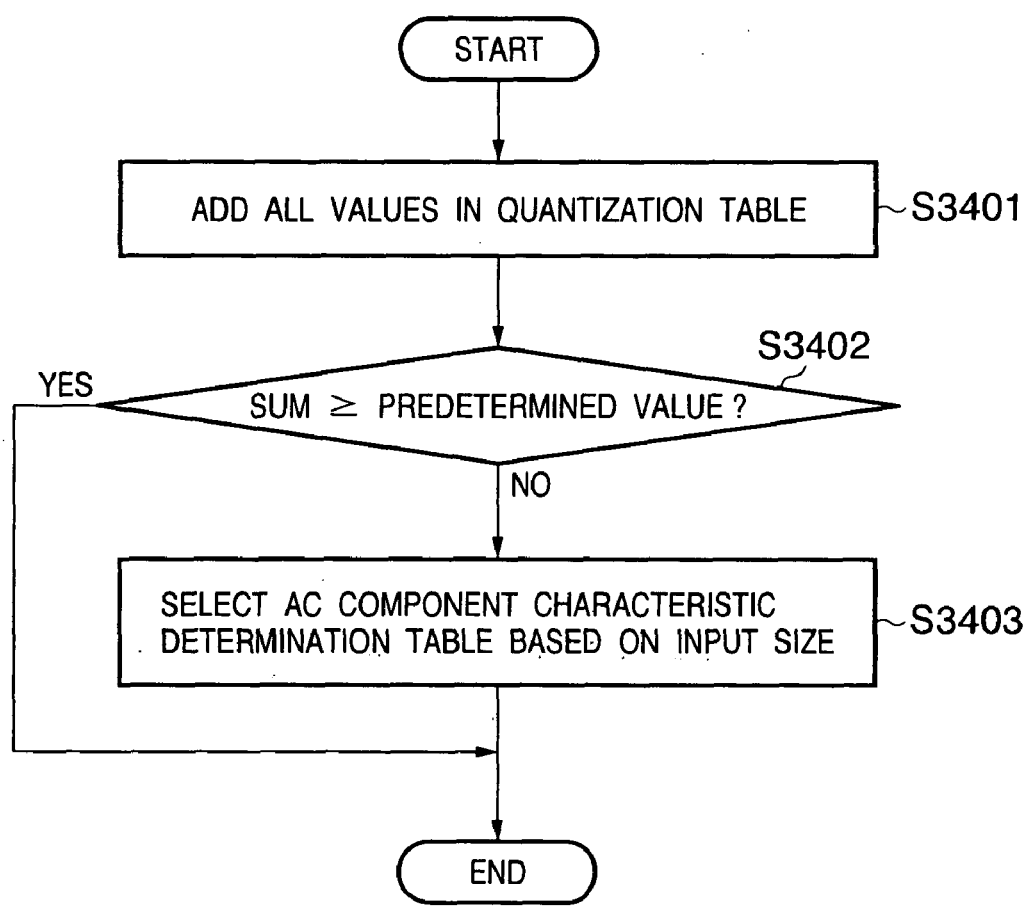
FIG. 34 is a flow chart showing an example of the sequence for setting an AC component characteristic determination table on the basis of the acquired quantization table.

When the processing based on the quantization table is executed before the second stage, the acquired quantization table undergoes a process shown in the flow chart of FIG. 34 to set an AC component characteristic determination table.

In this process, all values in the quantization table are summed up in step S3401. This sum total represents the degree of quantization. In step S3401, it is judged whether or not the sum total is larger than a predetermined value, e.g. "630". If this sum total is equal to or larger than 630, since it is determined that the spatial frequency characteristics of an image of interest have been changed, image of interest detection is aborted. If the sum total is less than 630, it is determined that the spatial frequency characteristics of an image of interest are free from any influences, and in step S3403, an AC component characteristic determination table is selected in correspondence with the input image size and then the process is proceeded to the selection process based on the spatial frequency.

The process based on the quantization table may be executed before the first stage. In this case, step S3403 is replaced with FIG. 6.

Improved Example 2 of Processing in the First Image Extraction

In the processing in above embodiment, in the first stage, the continue blocks having a flesh color in a lengthwise direction are extracted as a candidate with a number of blocks in widthwise direction being a predetermined number (e.g. 2 at VGA image or 4 at UXGA image), and, in the second stage, a selection based on a spatial frequency and a grouping of candidates in widthwise direction are performed. However, in the first stage, it may be performed to form a group of candidates neighboring in widthwise direction and the group of candidates is assigned a group number based on, for example, the above mentioned point, and, in the second stage, a selection from the groups based on a spatial frequency to extract finally an image area of interest can be performed. By this process, it is possible to make the process of the second stage simple and make the selection based on a spatial frequency stable.

This embodiment has explained the method of detecting an image of interest for an optimal image process of an image to be printed. Also, this embodiment can be used for an image to be displayed.

In this embodiment, in order to check the frequency component characteristics of the detected image, 63 frequency components are divided into seven groups by summing up 10 each of these components, so as to determine the image characteristics. Alternatively, all the 63 frequency components may be directly used in place of grouping.

Furthermore, after the continuous block length is detected in the lengthwise direction of an image, it is then detected in the widthwise direction. However, this detection order may be reversed. In addition to the method of detecting blocks as a group of a block array, many detection methods that combine chromaticity and frequency characteristics such as a method of confirming the spatial frequency characteristics using a block group which neighbors a group detected based on chromaticity in all directions, and the like are available. Such detection methods are also included in the present invention.

In this embodiment, as shown in FIGS. 4 and 27, the continuously detected block lengths are divided into three groups to be compared with the appropriate range of the frequency characteristics, so as to determine the acceptability of the frequency characteristics. The reason why the continuously detected block lengths are divided into three groups is to simplify the embodiment, and appropriate ranges may be set for respective continuous lengths. Since the continuous lengths have correlation, a method using a logical formula may be used in place of a table method. Also, the values of seven groups are used as the frequency characteristics. Alternatively, all 63 frequency components may be used, or determination may be made in consideration of specific frequency components.

In the description of this embodiment, a person flesh region is set as an image of interest to be detected. However, an object that can be detected based on the frequency components or a combination of the frequency components and chromaticity is not limited to the person flesh color, but the sky, sea, green of the trees, and the like can also be detected.

In this embodiment, values each obtained by summing up 10 frequency components of 8*8 blocks in ascending order of frequency are used, and the frequency characteristics are represented by those of groups as the sums of 10 components (the sum of three components in the highest frequency group). However, in case of a JPEG file, since the frequency characteristics are expressed by one DC component and 63 AC components, the characteristics need not be considered as sets of 10 components.

Also, determination may be made using the individual characteristics of 63 components, or a larger number of groups may be formed. Furthermore, the characteristics may be derived using only specific frequency components. In this manner, many use methods of AC components are available upon deriving the characteristics using the frequency characteristics.

Furthermore, this embodiment extracts candidates based on continuity of chromaticity relevant blocks in order to detect an image of interest in the vertical and horizontal directions as continuous 8*8 blocks. At this time, the present invention is not limited to such specific block group determination method.

In this embodiment, values obtained by deleting end ones of continuously detected chromaticity blocks are used as the characteristics depending on the detected continuous length. Also, a plurality of methods and combinations of separation based on the chromaticity and frequency components to determine a block group such as a method of setting the boundary of chromaticity blocks based on conformity using the frequency components (FIG. 21), a method of conducting a chromaticity search after blocks having specific frequency characteristics or higher are excluded, and so forth are available. Such methods are included in the scope of the present patent application.

FIG. 21 will be described below. A left image in FIG. 21 is an original image, and a right image is obtained by determining if the total data value of high-frequency components of those of an 8*8 pixel block as a compression unit of this JPEG file image exceeds a threshold value. Bright portions correspond to regions having high-frequency components, and dark portions correspond to regions with fewer high-frequency components. Image of interest detection based on chromaticity determination by setting these regions as the boundaries is also available.

This embodiment has disclosed the method using a "JPEG file" as a compressed image file. Also, image of interest detection for other files exploiting conversion into frequency components such as a "JPEG2000 file" and the like can be implemented by simple processes according to the same concept.

In this embodiment, image of interest detection is made by mainly using the frequency components and chromaticity and additionally considering layout information and the like. This is to make image correction based on an image of interest. Therefore, when it is detected that data including the luminance value of the detected image region of interest is not effective for correction (e.g., when the luminance value is too low and highlight is saturated), if excessive tone characteristics are provided as correction, the corrected image may be covered with many noise components.

To avoid such drawback, the luminance average is calculated using DC components of respective blocks in the detected spatial region of the detection result shown in FIG. 6, and it is compared if the luminance average falls within a luminance range suited to correction. In this way, an image of interest can always undergo image correction with higher precision.

Example of Arrangement of Image Processing Apparatus of Second Embodiment

Figure 51:
FIG. 51 shows an image sample obtained by taking a person face by a portable phone with a CCD having 300,000 pixels in the second embodiment.
Figure 53:
FIG. 53 shows a result of an unsharp mask process of eye and noise candidates selected from a person flesh (face) region of the image sample shown in FIG. 51 in the second embodiment.

FIG. 51 shows an image sample which is obtained by taking a picture of a face of a person as an image of interest. This image sample is taken using a device having 300,000 pixels, which belongs to low-performance devices among recent input devices, and has an image file size of 60 kbytes, i.e., a high compression ratio. Even when such image undergoes exposure correction by executing the image of interest detection of the above arrangement, no remarkable improvement of image quality is expected. As correction effective for such image, unsharp mask correction is normally done to remove any blur, thus attaining lively correction. As a drawback of this process, when the entire image undergoes unsharp mask correction, the flesh region appears roughened. Hence, when the correction is applied to the entire image, the correction strength can only be lowered. On the other hand, when the correction is applied to only eye and mouth regions for which such process is effective, it is difficult to attain automatic region designation.

Figure 50:
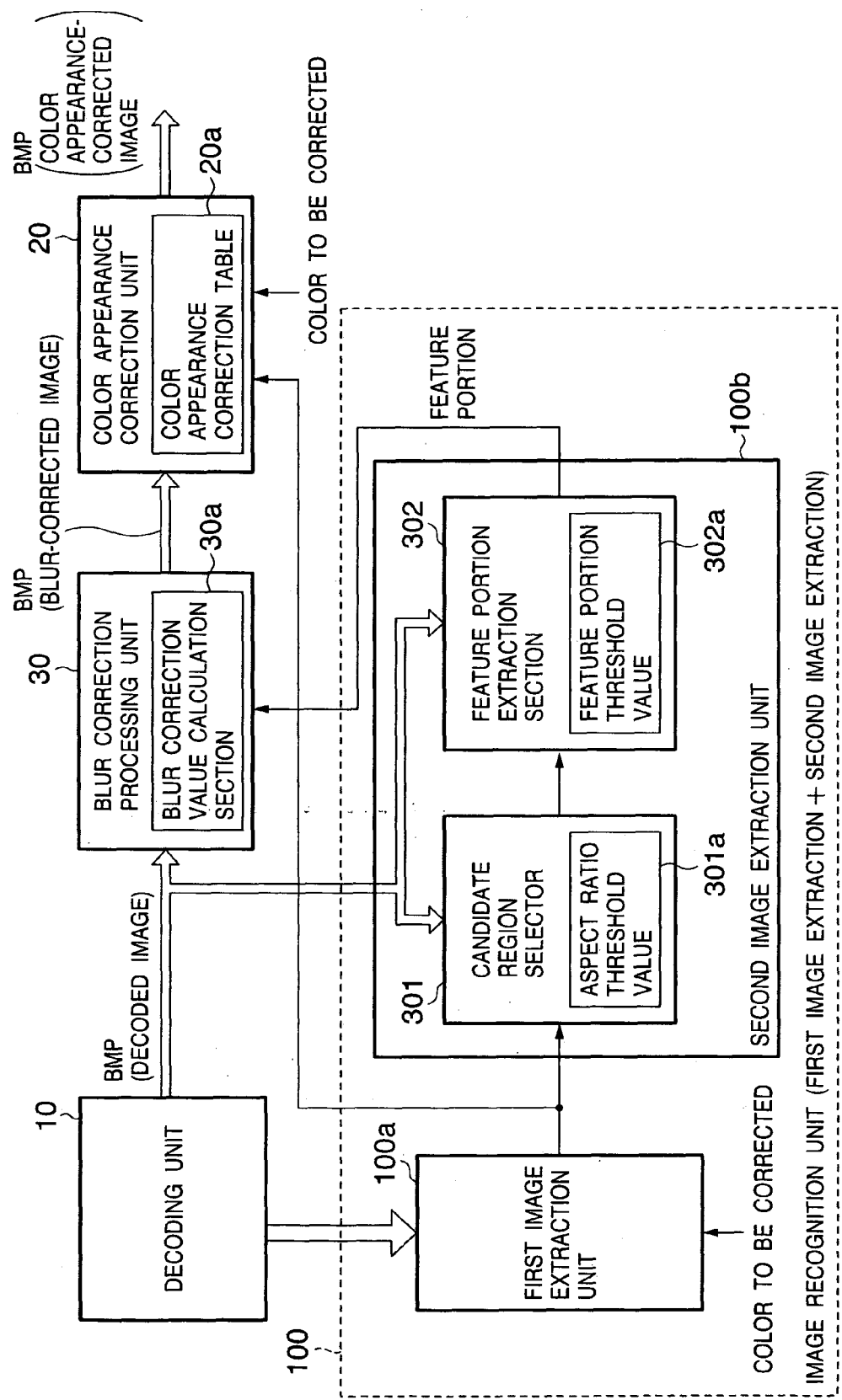
FIG. 50 is a block diagram showing an example of the arrangement of an image processing apparatus according to the second embodiment.

FIG. 50 is a block diagram showing an example of the arrangement of an image processing apparatus of the second embodiment. In FIG. 50, the building components of the first embodiment are illustrated as black boxes. These building components are basically the same as those in the first embodiment. As a characteristic feature of this embodiment, a second image extraction unit 100b and blur correction processing unit 30 are added.

The second image extraction unit 100b forms the image recognition unit 100 together with a first image extraction unit 100a of the first embodiment. The second image extraction unit 100b has a candidate region selection section 301 for selecting a candidate region on the basis an aspect ratio threshold value 301a of an image, and a feature portion extraction section 302 for extracting feature portions (eyes, nose, mouth, eyebrows, and the like in a face region in this embodiment) in the selected candidate region on the basis of a feature portion threshold value 302a. In this embodiment, a face region is selected based on the aspect ratio of the lines of a face.

A decoded image output from the decoding unit 10 undergoes a blur correction process in the blur correction processing unit 30 in accordance with a value calculated by a blur correction value calculation section 30a on the basis of the feature portion information output from the feature portion extraction section 302, prior to color appearance correction of the first embodiment.

Figure 60:
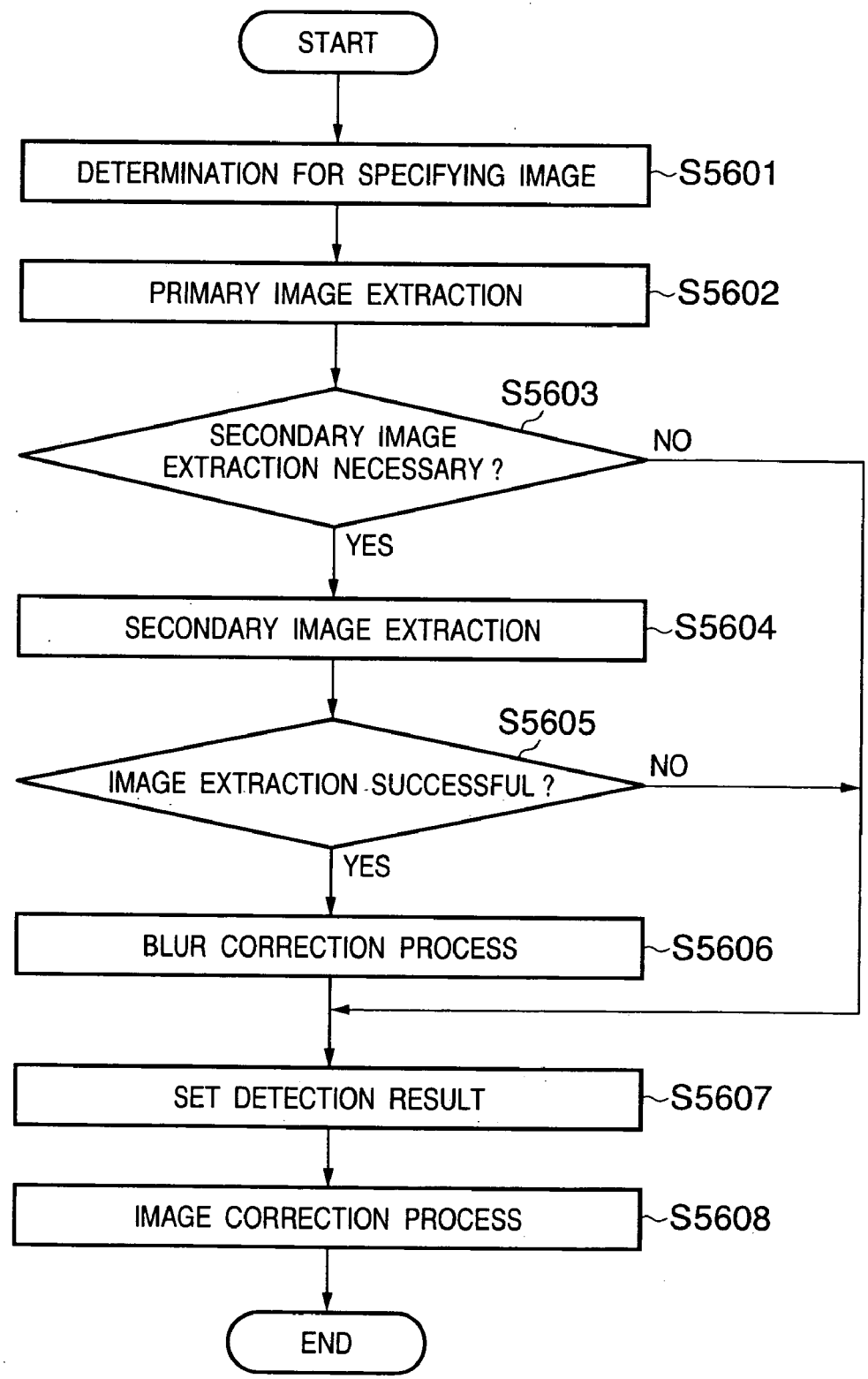
FIG. 60 is flow chart 1 of an extended image extraction process including a correction process in the second embodiment.

Example of Operation Sequence of Image
Processing Apparatus of Second Embodiment FIG. 60 is a flow chart showing an outline of the present invention that uses the person flesh region detection function of the above arrangement.

The flow chart will be described below.

This flow chart shows the flow of detection of a person face region from an input image according to the present invention, and the setup and execution of a detection & correction process of the eyes, mouth, and the like in the flesh region of the person face on the basis of the number of building pixels of the face region and quantization filter values.

In step S5601, information required to determine if second image extraction is necessary is acquired based on an enlargement factor and resolution information in a print process on the basis of the number of pixels of an objective image and a quantization table. An image with a smaller number of pixels, as shown in FIG. 51, can be selected as an object of secondary image extraction.

In step S5602, an image of interest extraction process based on the flow disclosed in FIG. 6 is executed. In this embodiment, a region having the feature amount of a person face flesh region is detected. From the image shown in FIG. 51, a region shown in FIG. 52 can be extracted. In FIG. 52, a white region is determined as a region having the feature amount of a person face flesh region, and a black portion is other than the above region. In this detection, the average luminance and the like are calculated in addition to the feature amount of the flesh region.

In step S5603, determination is made by logically ORing the detection results in steps S5601 and S5602. If no secondary image extraction is necessary, the flow jumps to step S5607 to execute the conventional process; otherwise, the flow advances to step S5604.

In step S5604, a secondary image extraction process is executed. More specifically, regions as candidates of the eyes and mouth, which are present within the detected person flesh color region in FIG. 52 but fall outside the chromaticity ratio range of primary extraction are detected and determined. Details of this process will be explained later.

It is checked in step S5605 if secondary image extraction has succeeded. If secondary image extraction has failed, the flow jumps to step S5607 to execute the conventional process; otherwise, the flow advances to step S5606.

In step S5606, a blur correction process is executed.

After that, the extraction result of image of interest detection in step S5607 is set to be passed to image correction.

In step S5608, image correction that reflects the extraction result is made.

Figure 61:
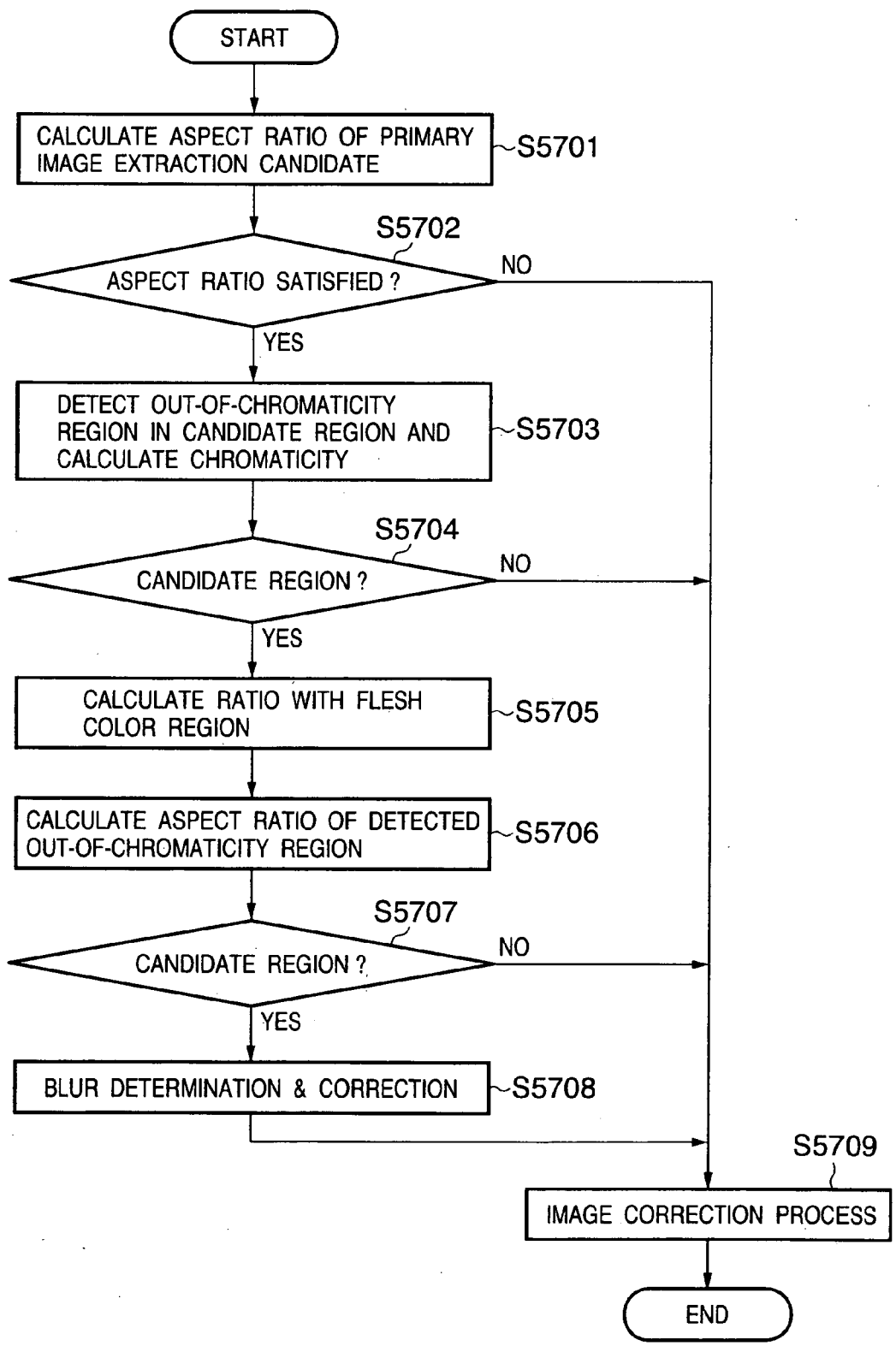
FIG. 61 is flow chart 2 of an extended image extraction process including a correction process in the second embodiment.

FIG. 61 is a flow chart for explaining the secondary image extraction process in more detail. The secondary image extraction process will be described below using FIG. 61.

In step S5701, the aspect ratio of a candidate image region of primary image extraction is calculated based on information from step S5602.

It is checked in step S5702 if the candidate image conforms to the aspect ratio definition of a person face. If the candidate image of primary extraction does not conform to the aspect ratio definition, the flow advances to step S5709; otherwise, the flow advances to step S5703.

In step S5703, regions which are present within the candidate region and fall outside the chromaticity ratio range of primary extraction are detected. In FIG. 52, such regions correspond to isolated black regions present in a white region as the person flesh region. The numbers of building pixels (numbers of blocks), the average chromaticity values, the average values of AC components of DCT, and the like of these regions are calculated.

In this embodiment, the eyes, mouth, eyebrows, eyeglasses, and the like are available as components of the person face other than the flesh color. Of these components, a process for the eye will be explained.

Figure 54:
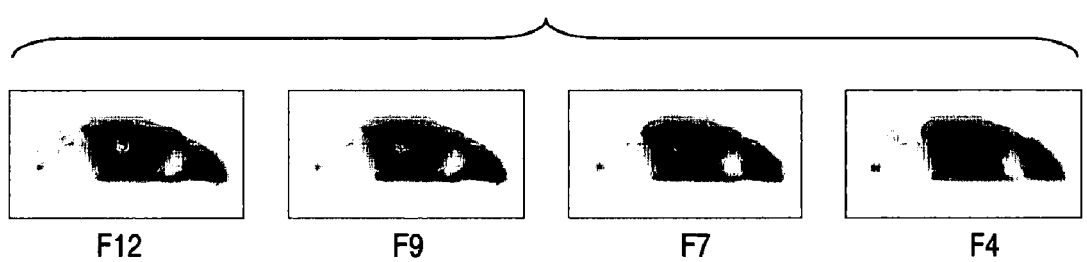
FIG. 54 shows images of an "eye" which are photographed to have a size of 22*12 pixels, and undergo four different save processes at high to low compression ratios "F4" to "F12" by changing the values of a JPEG quantization table in the second embodiment.
Figure 56:
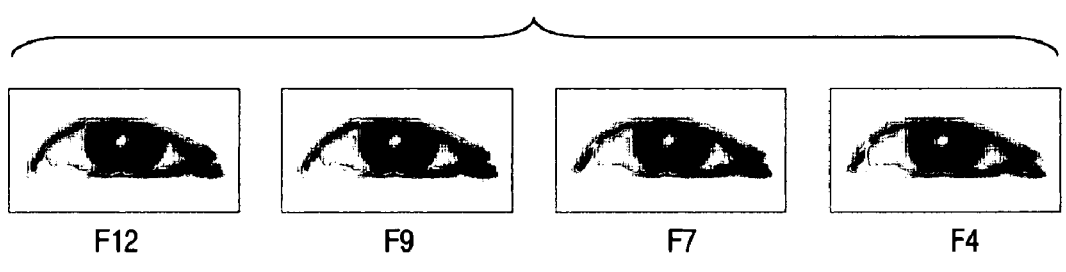
FIG. 56 shows images of an "eye" which are photographed to have a size of 44*24 pixels, and undergo four different save processes at high to low compression ratios "F4" to "F12" by changing the values of a JPEG quantization table in the second embodiment.

FIGS. 54, 56, and 58 show image samples of the eye.

In FIG. 54, an image of the eye region is formed by 12 pixels in the vertical direction*22 pixels in the horizontal direction, and this image is compressed using quantization tables for image compression shown in FIGS. 28 and 29. In FIG. 54, F12 is compressed using table "11"; F9, table "08"; F7, table "06"; and F4, table "03".

In FIG. 55, an image of the eye region is formed by 24 pixels in the vertical direction*44 pixels in the horizontal direction, and this image is compressed using quantization tables for image compression shown in FIGS. 28 and 29. In FIG. 55, F12 is compressed using table "11"; F9, table "08"; F7, table "06"; and F4, table "03".

In FIG. 56, an image of the eye region is formed by 48 pixels in the vertical direction*88 pixels in the horizontal direction, and this image is compressed using quantization tables for image compression shown in FIGS. 28 and 29. In FIG. 56, F12 is compressed using table "11"; F9, table "08"; F7, table "06"; and F4, table "03".

It is determined in step S5704 if the chromaticity ratio of the detected region falls within the chromaticity ratio range which is set in correspondence with the eye. The chromaticity ratio range for the mouth and the like can also be set. If it is determined that the detected region is inappropriate as a candidate, the flow jumps to step S5709; otherwise, the flow advances to step S5705.

In step S5705, the area ratio of the region detected in step S5703 to the person face flesh region detected in step S5701 is calculated to confirm if that region has an appropriate size as an eye candidate.

In step S5706, the aspect ratio of the region detected in step S5703 is calculated to confirm if that region falls within an appropriate outer shape ratio as an eye candidate.

It is checked in step S5707 based on the calculation results in steps S5705 and S5706 if the detection region can be a candidate region of the eye. If it is determined that the detection region is inappropriate as a candidate, the flow advances to step S5709; otherwise, the flow advances to step S5708.

In step S5708, an image blur amount is determined, a correction strength is set based on that determination result, and correction is then executed.

Figure 57:
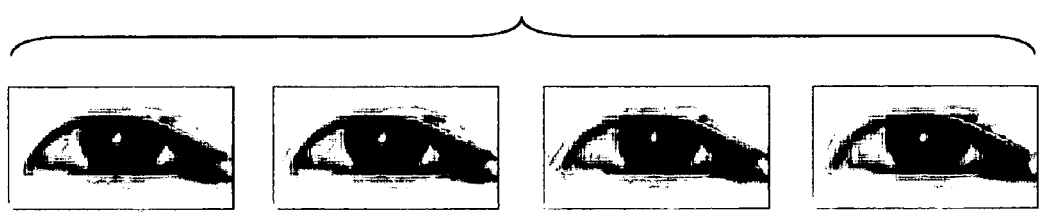
FIG. 57 shows the results of an unsharp mask image process for the images shown in FIG. 56 in the second embodiment.
Figure 59:
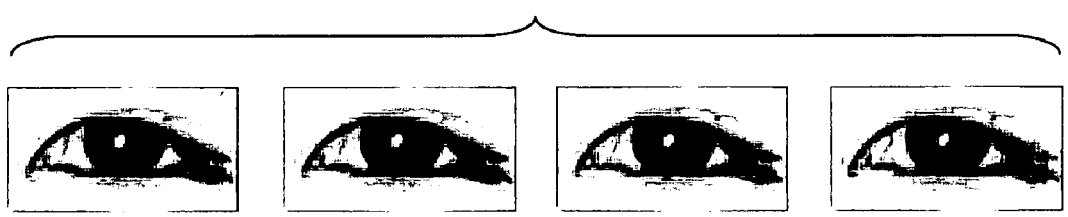
FIG. 59 shows the results of an unsharp mask image process for the images shown in FIG. 58 in the second embodiment.

The blur amount determination process will be described. FIGS. 55, 57, and 59 show images which are obtained by applying a given unsharp mask process to FIGS. 54, 56, and 58 as the aforementioned image samples of the eye region.

Figure 62:
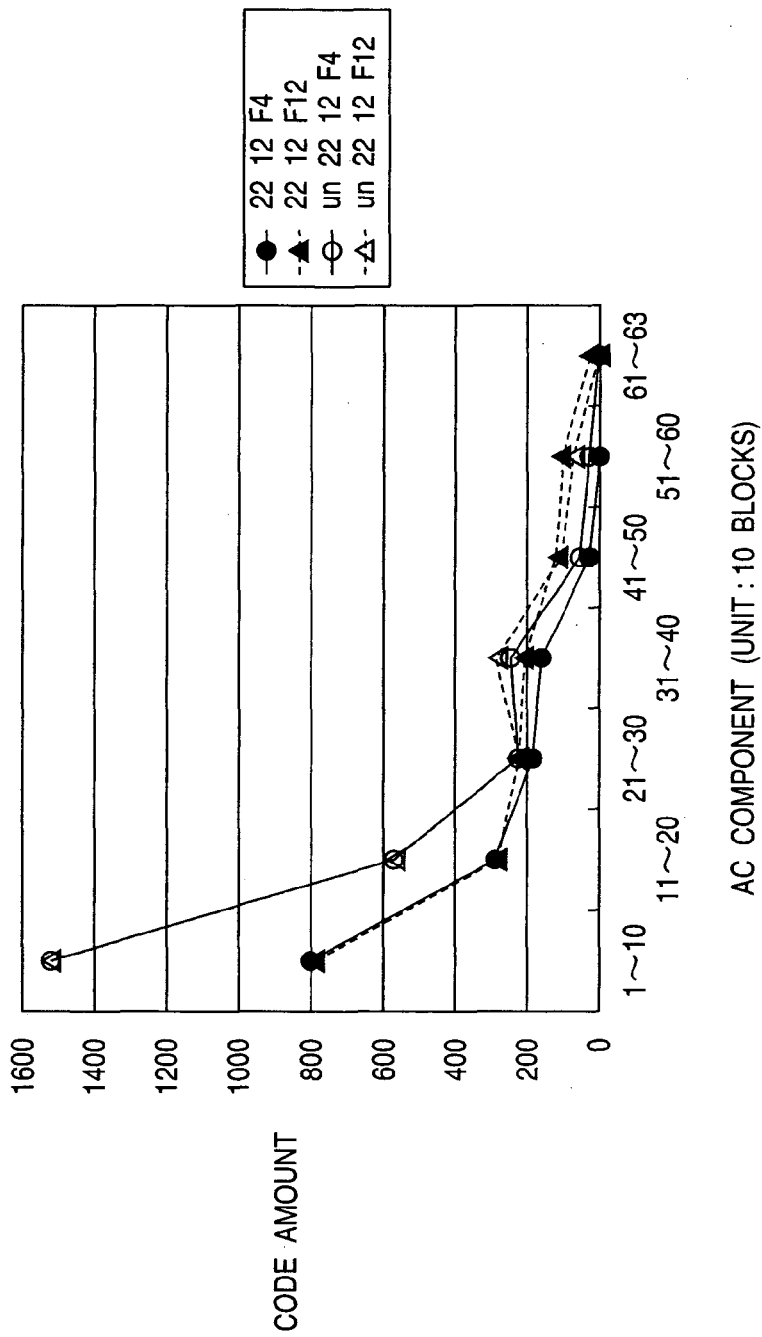
FIG. 62 is a graph which compares the quantization filter values and DCT characteristics of an unsharp mask process (22*12 size) in the second embodiment.
Figure 63:
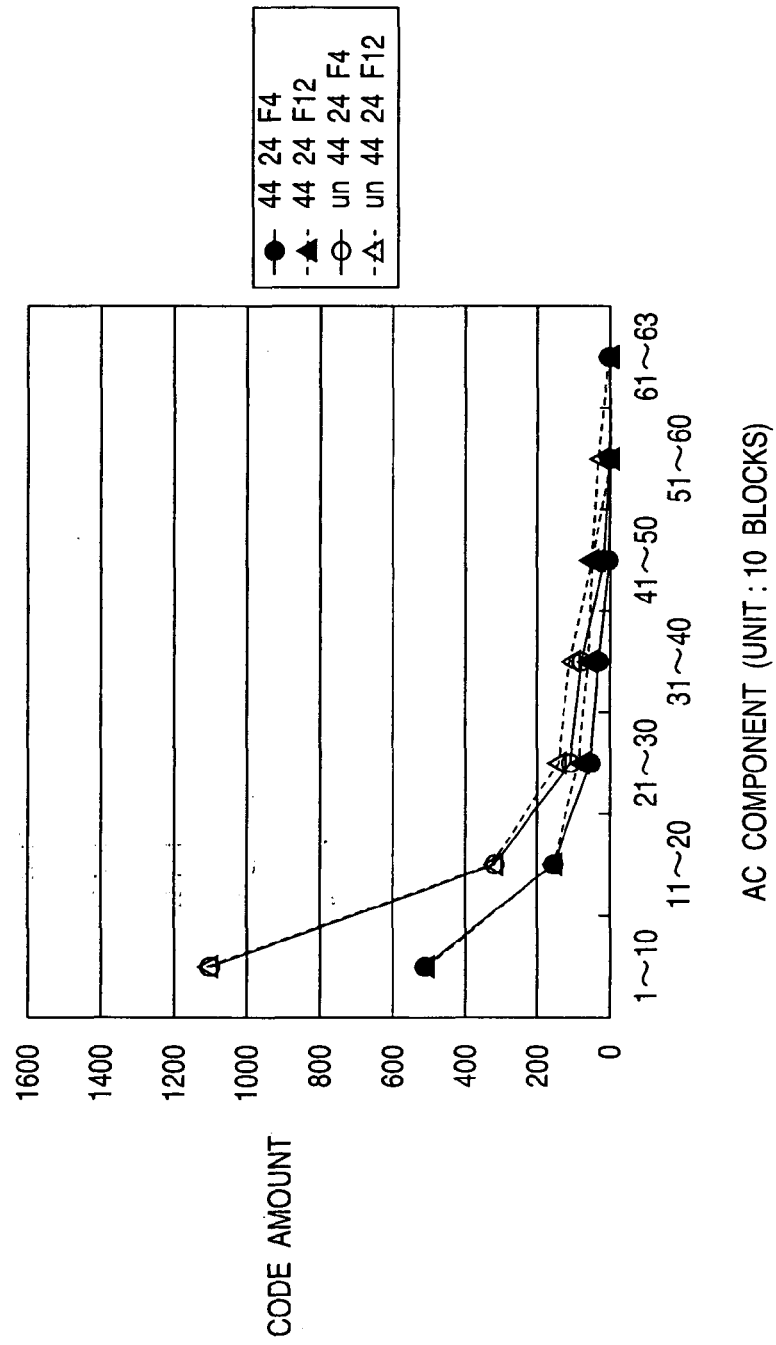
FIG. 63 is a graph which compares the quantization filter values and DCT characteristics of an unsharp mask process (44*24 size) in the second embodiment.
Figure 64:
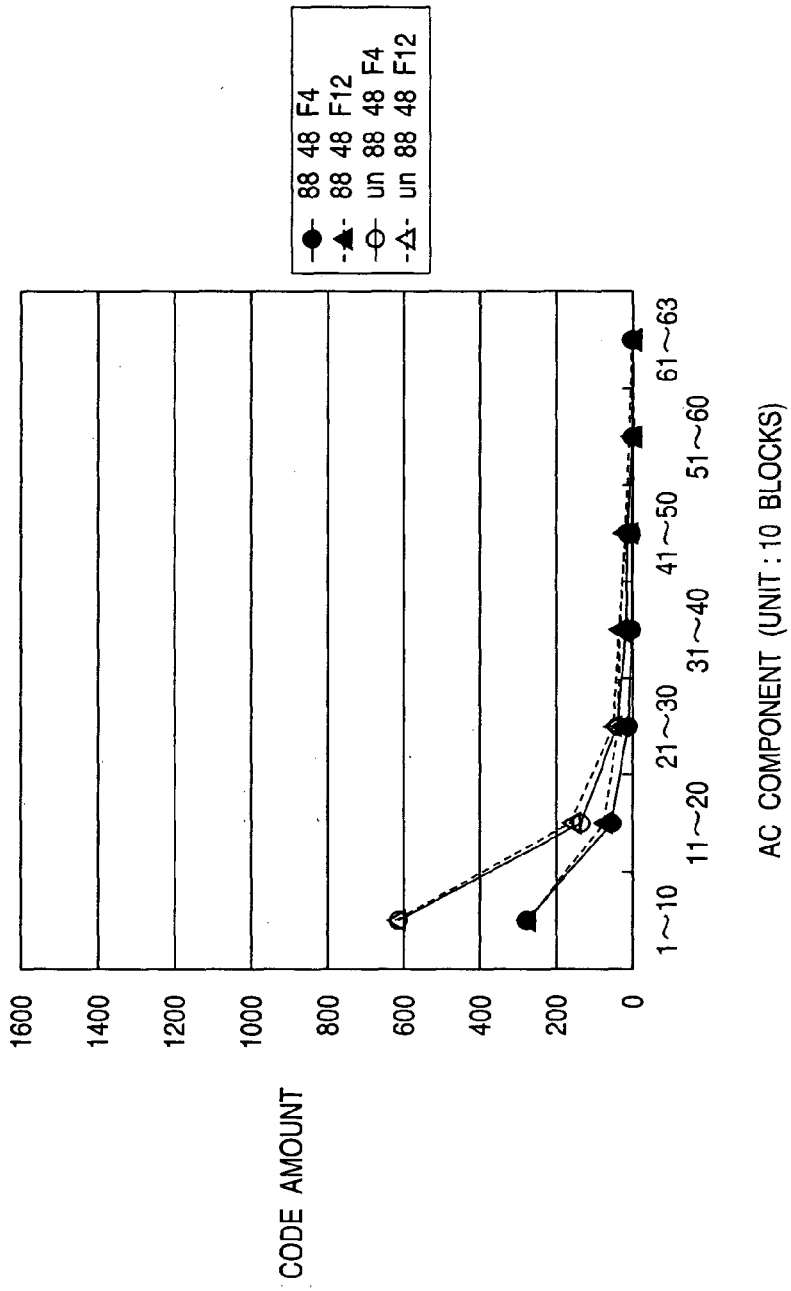
FIG. 64 is a graph which compares the quantization filter values and DCT characteristics of an unsharp mask process (88*48 size) in the second embodiment.

FIGS. 62, 63, and 64 show the feature amounts of the average values of AC components of DCT associated with these images.

In FIG. 62, an image of the eye region is formed by 12 pixels in the vertical direction*22 pixels in the horizontal direction, and the abscissa plots groups of each 10 average values of AC components of DCT values in turn from lower spatial frequency components as in the above graphs. The ordinate plots the code amount of DCT (the sum of 10 values; the sum of three components in the seventh group). As can be seen from the above contents, data size differences due to use of different quantization filters appear in high spatial frequency components, but they are small in objective regions as the eye region. Since the unsharp mask process raises the spatial frequency characteristics of low-frequency components, a lively image is obtained.

In FIG. 63, an image of the eye region is formed by 24 pixels in the vertical direction*44 pixels in the horizontal direction, and the graph format is the same as that in FIG. 62. As can be seen from the above contents, data size differences due to use of different quantization filters appear in high spatial frequency components, but they are small in objective regions as the eye region. Since the unsharp mask process raises the spatial frequency characteristics of low-frequency components, a lively image is obtained.

In FIG. 64, an image of the eye region is formed by 48 pixels in the vertical direction*88 pixels in the horizontal direction, and the graph format is the same as that in FIG. 62. As can be seen from the above contents, data size differences due to use of different quantization filters appear in high spatial frequency components, but they are small in objective regions as the eye region. Since the unsharp mask process raises the spatial frequency characteristics of low-frequency components, a lively image is obtained.

As differences depending on image sizes, the feature amounts as the average values of AC components of DCT values decrease with increasing number of building pixels. On the other hand, the distribution of AC components remains the same.

In order to reflect the effect of the unsharp mask process based on the number of pixels of the eye image and quantization filter values on the correction result, the correction strength of an unsharp mask is designated on the basis of the size of the detected secondary extraction region and quantization filter values, as shown in FIG. 65.

On the other hand, when the flesh color region detected by primary extraction has a broad luminance distribution range, e.g., when the person face flesh region has a large luminance width between bright and dark portions under the direct sunlight outdoors, a sharp correction effect is small. In such case, as shown in FIG. 66, when the luminance range is expressed by 0 to 255, the unsharp mask process strength to the secondary extraction region in the flesh color region which has luminance range data of 150 or higher and is detected by primary extraction is set to be relatively strong in accordance with the luminance distribution range of the flesh color region detected by primary extraction.

In step S5709, image correction that reflects the value of the extraction result is executed.

FIG. 52 shows the result of the aforementioned process for FIG. 31. As can be seen from FIG. 52, a blurred image has undergone appropriate correction by specifying a region.

As described above, according to the present invention, spatial frequency data and a quantization table are acquired during a decompression process of a compressed image file, and a combination of the spatial frequency data and quantization data characteristics are used to search an image file for an image of interest. Hence, information containing AC components for respective image data blocks can be acquired without any advanced calculations, thus searching an image file for an image of interest.

According to another feature of the present invention, even in a built-in type device which has lower processing performance than a personal computer (e.g., when an image is directly printed from a digital camera), the presence/absence of an image of interest to be corrected, and the degree of effectiveness of that value can be detected from a compressed image file to be printed by a process within the available range of that product. Hence, image correction that places an importance on an image of interest can be applied as needed.

Note that the image recognition apparatus of this embodiment described above comprises a CPU or MPU, RAM, ROM, and the like of a computer, and is also implemented by executing a program stored in the RAM or ROM.

Therefore, the aforementioned apparatus can also be implemented by recording a program which makes the computer run to execute the aforementioned functions on a recording medium such as a CD-ROM or the like, and loading that program to the computer. As the recording medium which records the program, a flexible disk, hard disk, magnetic tape, magnetooptical disk, nonvolatile memory card, and the like can be used in addition to the CD-ROM.

Not only when the functions of the above embodiments are implemented by executing the supplied program by the computer but also when the functions of the above embodiments are implemented by collaboration of the program and an OS (operating system), another application software, or the like, which runs on the computer, such program is included in the embodiment of the present invention.

In order to use the present invention in a network environment, all or some program components may be executed by another computer. For example, a screen input process may be executed by a remote terminal computer, and various judgment processes, log recording processes, and the like may be executed by another center computer or the like.

As many apparently widely different embodiments of the present invention can be made without departing from the spirit and scope thereof, it is to be understood that the invention is not limited to the specific embodiments thereof except as defined in the claims.

What is claimed is:

1. A method of recognizing an image area of interest from compressed image data through a process for reconstructing decompressed image data from the compressed image data, comprising the steps of:

acquiring spatial frequency information and chromaticity information for respective predetermined blocks from the compressed image data; and searching for the image area of interest from the compressed image data using the acquired spatial frequency information and chromaticity information.

2. A method according to claim 1, further comprising a step of decompressing the compressed image data, wherein in said acquiring step, the spatial frequency information and chromaticity information are acquired from the decompressed image data.

3. Method according to claim 2, further comprising the steps of: acquiring quantization parameters for decompression; and stopping extraction of the image area of interest in accordance with the acquired quantization parameters.

4. A method according to claim 2, wherein the compressed image data comprises JPEG image data and the decompressed image data includes DCT coefficients and bit map data.

5. A method according to claim 1, wherein said searching step comprises the steps of:

extracting consecutive blocks having a predetermined range of chromaticity values; and determining whether or not the extracted consecutive blocks are the image area of interest based on an average of spatial frequency values within the extracted consecutive blocks.

6. A method according to claim 5, wherein a threshold level for determining whether or not the extracted consecutive blocks are the image area of interest is changed in accordance with a size of image to be extracted.

7. A method according to claim 5, wherein said searching step further comprises a step of selecting candidates of the image area of interest based on a number of the extracted consecutive blocks.

8. A method according to claim 7, wherein a threshold level for selecting candidates of the image area of interest is changed in accordance with a size of image to be extracted.

9. A computer-readable medium storing a computer program for causing a computer to execute the method according to claim 1.

10. A method of recognizing an image area of interest from compressed image data and decoding image data from the compressed image data, through a process for reconstructing decompressed image data from the compressed image data, comprising the steps of:

recognizing an image area of interest from the compressed image data; and reconstructing an image with correction of image data in the image area of interest to a predetermined value, wherein said recognizing step comprises the steps of:

acquiring spatial frequency information and chromaticity information for respective predetermined blocks from the compressed image data; and searching for the image area of interest from the compressed image data using the acquired spatial frequency information and chromaticity information.

11. A method according to claim 10, wherein the predetermined value comprises a predetermined chromaticity value.

12. A method according to claim 10, wherein said recognizing step further comprises a step of decompressing the compressed image data, and wherein in said acquiring step, the spatial frequency information and chromaticity information are acquired from the decompressed image data.

13. A method according to claim 12, further comprising the steps of:

acquiring quantization parameters for decompression; and stopping extraction of the image area of interest in accordance with the acquired quantization parameters.

14. A method according to claim 12, wherein the compressed image data comprises JPEG image data and the decompressed image data includes DCT coefficients and bit map data.

15. A method according to claim 10, wherein said searching step comprises the steps of:

extracting consecutive blocks having a predetermined range of chromaticity value; and determining whether or not the extracted consecutive blocks are the image area of interest based on an average of spatial frequency values within the extracted consecutive blocks.

16. A method according to claim 15, wherein a threshold level for determining whether or not the extracted consecutive blocks are the image area of interest is changed in accordance with a size of image to be extracted.

17. A method according to claim 15, wherein said searching step further comprises a step of selecting candidates of the image area of interest based on a number of the extracted consecutive blocks.

18. A method according to claim 17, wherein a threshold level for selecting candidates of the image area of interest is changed in accordance with a size of image to be extracted.

19. A computer-readable medium storing a computer program for causing a computer to execute the method according to claim 10.

20. An image processing apparatus for recognizing an image area of interest from compressed image data through a process for reconstructing decompressed image data from the compressed image data, comprising:

acquiring means for acquiring spatial frequency information and chromaticity information for respective predetermined blocks from the compressed image data; and searching means for searching for the image area of interest from the compressed image data using the spatial frequency information and chromaticity information acquired by said acquiring means.

21. An apparatus according to claim 20, further comprising decompressing means for decompressing the compressed image data, wherein in said acquiring step, the spatial frequency information and chromaticity information are acquired from the decompressed image data.

22. An apparatus according to claim 21, further comprising:

second acquiring means for acquiring quantization parameters for decompression; and stopping means for stopping extraction of the image area of interest in accordance with the quantization parameters acquired by said second acquiring means.

23. An apparatus according to claim 21, wherein the compressed image data comprises JPEG image data and the decompressed image data includes DCT coefficients and bit map data.

24. An apparatus according to claim 20, wherein said searching means comprises:

extracting means for extracting consecutive blocks having a predetermined range of chromaticity values; and determining means for determining whether or not the extracted consecutive blocks are the image area of interest based on an average of spatial frequency values within the extracted consecutive blocks.

25. An apparatus according to claim 24, wherein a threshold level for determining whether or not the extracted consecutive blocks are the image area of interest is changed in accordance with a size of image to be extracted.

26. An apparatus according to claim 24, wherein said searching means further comprises selecting means for selecting candidates of the image area of interest based on a number of the extracted consecutive blocks.

27. An apparatus according to claim 26, wherein a threshold level for selecting candidates of the image area of interest is changed in accordance with a size of image to be extracted.

28. An image processing apparatus for recognizing an image area of interest from compressed image data and decoding image data from the compressed image data, through a process for reconstructing decompressed image data from the compressed image data, comprising:

recognizing means for recognizing an image area of interest from the compressed image data; and
reconstructing means for reconstructing an image with correction of image data in the image area of interest to a predetermined value,
wherein said recognizing means comprises:
acquiring means for acquiring spatial frequency information and chromaticity information for respective predetermined blocks from the compressed image data; and
searching means for searching for the image area of interest from the compressed image data using the acquired spatial frequency information and chromaticity information.

29. An apparatus according to claim 28, wherein the predetermined value comprises a predetermined chromaticity value.

30. An apparatus according to claim 28, wherein said recognizing means further comprises decompressing means for decompressing the compressed image data, and wherein said acquiring means acquires the spatial frequency information and chromaticity information from the decompressed image data.

31. An apparatus according to claim 30, further comprising:

second acquiring means for acquiring quantization parameters for decompression; and
stopping means for stopping extraction of the image area of interest in accordance with the acquired quantization parameters.

32. An apparatus according to claim 30, wherein the compressed image data comprises JPEG image data and the decompressed image data includes DCT coefficients and bit map data.

33. An apparatus according to claim 32, wherein said searching means further comprises means for selecting ca2ndidates of the image area of interest based on a number of the extracted consecutive blocks.

34. An apparatus according to claim 33, wherein a threshold level for selecting candidates of the image area of interest is changed in accordance with a size of image to be extracted.

35. An apparatus according to claim 28, wherein said searching means comprises:

extracting means for extracting consecutive blocks having a predetermined range of chromaticity values; and
determining means for determining whether or not the extracted consecutive blocks are the image area of interest based on an average of spatial frequency values within the extracted consecutive blocks.

36. An apparatus according to claim 35, wherein a threshold level for determining whether or not the extracted consecutive blocks are the image area of interest is changed in accordance with a size of image to be extracted.

* * * * *

UNITED STATES PATENT AND TRADEMARK OFFICE
CERTIFICATE OF CORRECTION

PATENT NO. : 7,356,190 B2 Page 1 of 1
APPLICATION NO. : 10/608001
DATED : April 8, 2008
INVENTOR(S) : Shigeru Mizoguchi et al.

It is certified that error appears in the above-identified patent and that said Letters Patent is hereby corrected as shown below:

COLUMN 6
Line 41, "noise" should read --nose--.

COLUMN 14
Line 38, "fresh" should read --flesh--.
Line 45, "noise" should read --a nose--.

COLUMN 20
Line 16, "group is" should read --group--.
Line 17, "select" should read --selected--.

COLUMN 22
Line 9, "component are inclined to be lose" should read --components are inclined to be lost--.
Line 10, "on interest can be error." should read --of interest can be in error.--.

COLUMN 29
Line 12, "Method" should read --A method--.

COLUMN 32
Line 17, "ca2ndidates" should read --candidates--.

Signed and Sealed this

Tenth Day of February, 2009

JOHN DOLL
*Acting Director of the United States Patent and Trademark Office*